United States Patent
Acharya et al.

(10) Patent No.: US 10,834,207 B2
(45) Date of Patent: Nov. 10, 2020

(54) SYSTEM AND METHOD FOR UPDATING SOFTWARE IN AN ELECTRONIC DEVICE

(71) Applicant: Excelfore Corporation, Fremont, CA (US)

(72) Inventors: Shrikant Acharya, Fremont, CA (US); Shrinath Acharya, Fremont, CA (US); Anoop Balakrishnan, Fremont, CA (US); John Crosbie, Fremont, CA (US)

(73) Assignee: Excelfore Corporation, Fremont, CA (US)

( * ) Notice: Subject to any disclaimer, the term of this patent is extended or adjusted under 35 U.S.C. 154(b) by 0 days.

(21) Appl. No.: 16/287,524

(22) Filed: Feb. 27, 2019

(65) Prior Publication Data

US 2019/0265965 A1    Aug. 29, 2019

Related U.S. Application Data

(60) Provisional application No. 62/635,648, filed on Feb. 27, 2018.

(51) Int. Cl.
*G06F 8/65*        (2018.01)
*G06F 8/658*       (2018.01)
(Continued)

(52) U.S. Cl.
CPC .............. *H04L 67/141* (2013.01); *G06F 8/65* (2013.01); *G06F 8/658* (2018.02); *H04L 9/006* (2013.01);
(Continued)

(58) Field of Classification Search
CPC ....................................................... G06F 8/658
See application file for complete search history.

(56) References Cited

U.S. PATENT DOCUMENTS 8,418,168 B2 * 4/2013 Tyhurst .................... G06F 8/65
                                                         717/173
9,215,228 B1 * 12/2015 Zhang ..................... H04L 9/321
(Continued)

FOREIGN PATENT DOCUMENTS

EP         1956794 B1 * 10/2011  ............. H04L 69/08

OTHER PUBLICATIONS

Teraoka, Hidetoshi, Fumiharu Nakahara, and Kenichi Kurosawa. "Incremental update method for resource-constrained in-vehicle ECUs." 2016 IEEE 5th Global Conference on Consumer Electronics. IEEE, 2016. (Year: 2016).*
(Continued)

*Primary Examiner* — Matthew J Brophy
(74) *Attorney, Agent, or Firm* — Lempia Summerfield Katz LLC

(57) ABSTRACT

A System and Method for Updating Software in a Vehicle is provided. Software in a vehicle may, at times, be subject to update. In this regard, a server may send the update software to one or more electronic devices in the vehicle. The server may receive the capabilities of the electronic devices in the vehicle, such as the memory, computational, security capabilities, or the like, and tailor the sending of the software update based on the capabilities of the electronic devices. For example, the division of the software update, the sections of memory from which to determine the delta, the compression schemes, and/or where certain functions (such as where decryption occurs) may be dependent on the capabilities of the electronic devices in the vehicle.

18 Claims, 14 Drawing Sheets

(51) Int. Cl.
*H04L 29/08* (2006.01)
*H04W 4/44* (2018.01)
*H04L 9/00* (2006.01)
*H04L 9/08* (2006.01)
*H04L 9/32* (2006.01)
*H04L 12/40* (2006.01)
*H04L 12/741* (2013.01)
*H04L 29/06* (2006.01)
*H04L 29/12* (2006.01)

(52) U.S. Cl.
CPC .......... *H04L 9/0816* (2013.01); *H04L 9/3263* (2013.01); *H04L 12/40* (2013.01); *H04L 45/74* (2013.01); *H04L 61/103* (2013.01); *H04L 63/0823* (2013.01); *H04L 63/102* (2013.01); *H04L 63/166* (2013.01); *H04L 67/12* (2013.01); *H04L 67/34* (2013.01); *H04W 4/44* (2018.02); *H04L 2012/40215* (2013.01); *H04L 2012/40273* (2013.01)

(56) References Cited

U.S. PATENT DOCUMENTS

| | | | | |
|---|---|---|---|---|
| 9,432,437 | B1* | 8/2016 | Leonard | H04L 67/26 |
| 9,443,358 | B2* | 9/2016 | Breed | G07C 5/008 |
| 9,529,580 | B2 | 12/2016 | Vangelov | |
| 9,836,300 | B2* | 12/2017 | Moeller | H04L 67/34 |
| 9,841,970 | B2 | 12/2017 | Vangelov | |
| 10,394,548 | B2* | 8/2019 | Fox | G06F 8/654 |
| 10,402,192 | B2* | 9/2019 | Fox | G06F 12/0646 |
| 10,725,772 | B2* | 7/2020 | Teraoka | G06F 11/00 |
| 2004/0003249 | A1* | 1/2004 | Dabbish | H04L 63/126 |
| | | | | 713/170 |
| 2004/0136246 | A1* | 7/2004 | Kosuge | G06F 8/656 |
| | | | | 365/200 |
| 2006/0206537 | A1* | 9/2006 | Chiang | G06F 8/658 |
| 2009/0070374 | A1* | 3/2009 | Eker | G06F 8/658 |
| 2009/0300596 | A1* | 12/2009 | Tyhurst | G06F 8/65 |
| | | | | 717/173 |
| 2013/0110976 | A1* | 5/2013 | Berg | G06F 8/64 |
| | | | | 709/217 |
| 2014/0282470 | A1* | 9/2014 | Buga | G06F 8/65 |
| | | | | 717/170 |
| 2016/0026458 | A1* | 1/2016 | Wist | G06F 8/658 |
| | | | | 717/168 |
| 2016/0291940 | A1* | 10/2016 | Searle | H04L 63/10 |
| 2016/0294605 | A1* | 10/2016 | Searle | H04L 41/082 |
| 2016/0294614 | A1* | 10/2016 | Searle | H04L 67/34 |
| 2016/0364230 | A1* | 12/2016 | Moeller | G06F 8/654 |
| 2016/0364232 | A1* | 12/2016 | Moeller | H04L 67/34 |
| 2016/0371076 | A1* | 12/2016 | Moeller | G06F 8/654 |
| 2017/0242678 | A1 | 8/2017 | Sangameswaran | |
| 2017/0242679 | A1 | 8/2017 | Sangameswaran | |
| 2017/0249164 | A1* | 8/2017 | Petkov | G06F 8/63 |
| 2017/0255459 | A1* | 9/2017 | Tanimoto | G06F 12/0246 |
| 2017/0262274 | A1 | 9/2017 | Vangelov | |
| 2018/0032324 | A1* | 2/2018 | Sarkar | G06F 8/658 |
| 2018/0088936 | A1* | 3/2018 | Tanimoto | G06F 8/71 |
| 2018/0095745 | A1* | 4/2018 | Mine | G06F 8/658 |
| 2019/0034193 | A1* | 1/2019 | Fox | G06F 12/0646 |
| 2019/0034197 | A1* | 1/2019 | Lin | H04W 4/40 |
| 2019/0138298 | A1* | 5/2019 | Teraoka | B60R 16/02 |
| 2019/0213000 | A1* | 7/2019 | Disegni | H04L 67/34 |
| 2019/0213001 | A1* | 7/2019 | Fox | G06F 11/1629 |
| 2019/0220270 | A1* | 7/2019 | Fox | G06F 9/44521 |
| 2019/0235855 | A1* | 8/2019 | Nakano | G06F 13/4204 |
| 2019/0324739 | A1* | 10/2019 | Fox | G06F 8/60 |
| 2019/0324858 | A1* | 10/2019 | Sarkar | G06F 8/658 |
| 2019/0361696 | A1* | 11/2019 | Nakano | G06F 8/65 |
| 2019/0391800 | A1* | 12/2019 | Lin | H04L 67/34 |
| 2020/0034139 | A1* | 1/2020 | Fox | B60W 50/0225 |

OTHER PUBLICATIONS

Ji, Zhang, ZhuXiangyu, and Peng Yong. "Implementation and research of bootloader for automobile ECU remote incremental update." AASRI International Conference on Industrial Electronics and Applications (IEA 2015). (Year: 2015).*

Idrees, Muhammad Sabir, et al. "Secure automotive on-board protocols: a case of over-the-air firmware updates." International Workshop on Communication Technologies for Vehicles. Springer, Berlin, Heidelberg, 2011. (Year: 2011).*

Chawan, Akshay, et al. "Security Enhancement of Over-the-Air Update for Connected Vehicles." International Conference on Wireless Algorithms, Systems, and Applications. Springer, Cham, 2018. (Year: 2018).*

* cited by examiner

US 10,834,207 B2

SYSTEM AND METHOD FOR UPDATING SOFTWARE IN AN ELECTRONIC DEVICE

REFERENCE TO RELATED APPLICATION

This application claims the benefit of U.S. Provisional Patent Application Ser. No. 62/635,648, filed on Feb. 27, 2018, incorporated by reference herein in its entirety.

TECHNICAL FIELD

This application relates generally to software executed on an electronic device, such as an electronic device in a vehicle. More specifically, this application relates to providing and installing software updates in remote devices, such as mobile remote devices (e.g., vehicles) or stationary remote devices (e.g., buildings).

BACKGROUND

Vehicles today include electronics to control and manage the vehicle. The electronics may be in various forms, such as microprocessors, microcontrollers, or the like. The electronics execute software therein in order to provide the functionality desired (e.g., in order to manage and control the operation of the vehicle). The software resident in the vehicle may be subject to software updates. These software updates may be periodically installed in the vehicle (e.g., in the electronics) for various purposes, such as to correct or resolve software errors, add new features on demand or through subscription, upgrade the software to prevent hacking, or the like.

DETAILED DESCRIPTION

Figure 1A:
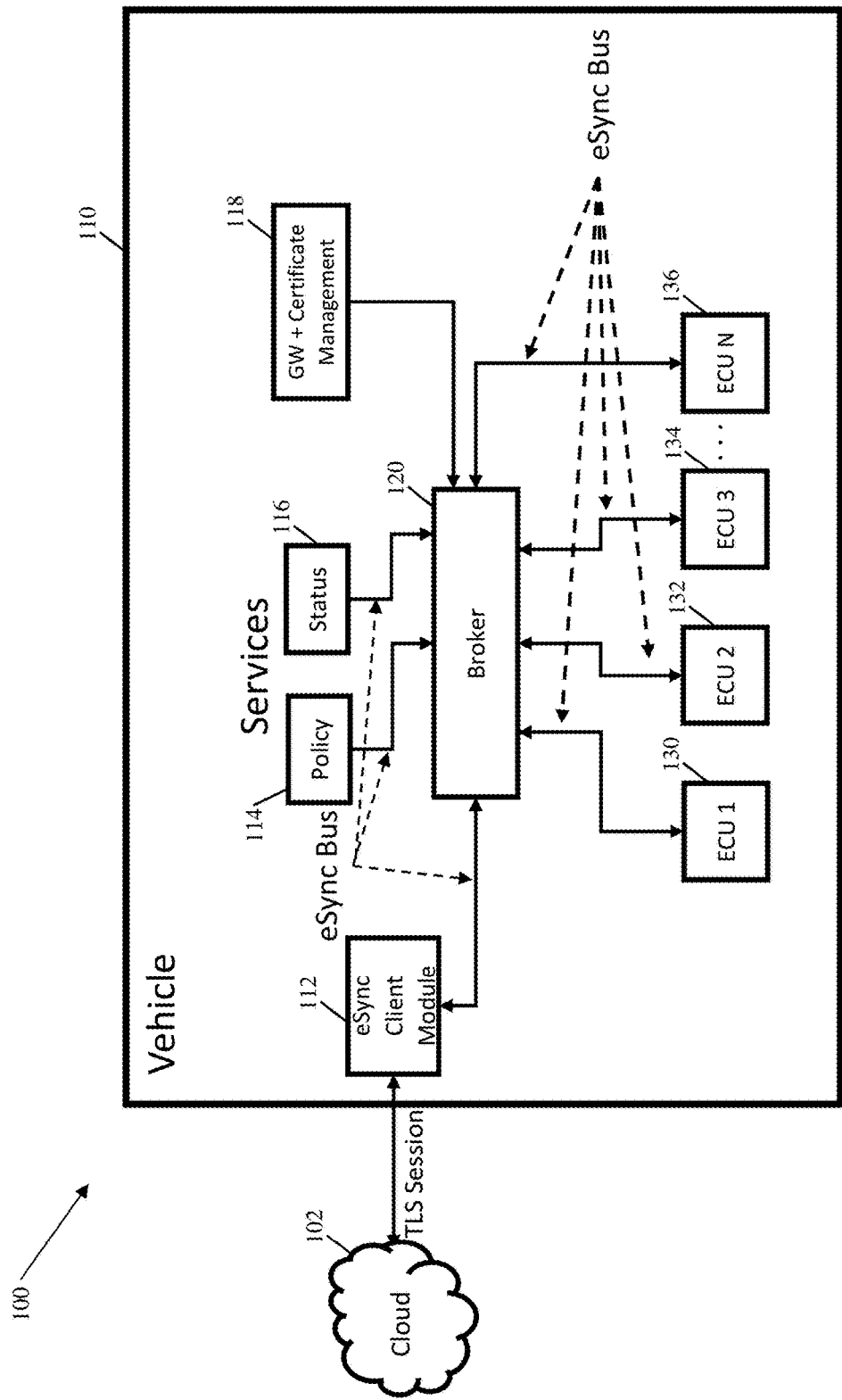
FIG. 1A illustrates a block diagram of functional devices within a vehicle and a proprietary bus interconnecting the functional devices.

Software may be present in a variety of contexts, such as vehicles, buildings, passenger ships, trains, automated mass transit systems, or any other type of large constituent system. As one example, software may be present in one or more electronic devices resident in a vehicle. As another example, software may be present in a plurality of electronic devices within a building or other type of dwelling or residence. In particular, buildings may necessitate extensive monitoring, with electronics therein to manage various operations in the buildings, including their energy consumption, emergency evacuation, etc. The building may have multiple zones (such as multiple floors) with each zone have one or more electronic devices assigned or associated with the respective zone. In the multi-floor building example, a building with 30 floors may have an electronic device (or a set of electronic devices) assigned or associated with each respective floor in order to control communication, heating/air conditioning, fire safety, and the like. As still another example, electronic devices may be used in passenger ships, trains, or automated mass transit systems.

Periodically, the software in the electronic devices may be updated. In particular, as discussed in the background, software in vehicles may be periodically updated. Thus, any discussion below regarding updating of software for a vehicle may likewise be applied to updating software in any other context, such as in the context of a building.

One form of updating software in vehicles is Software/Firmware Over-the-Air (SOTA/FOTA) Updating. SOTA/FOTA may be used to: (a) fix software problems without issuing a recall; and/or (b) offer newer subscription based services. The former helps with reducing warranty recall costs and increases customer satisfaction for the OEM brand, whereas the latter may assist in generating revenue.

The software update may be delivered in one of several ways. One way is to deliver the software update as a delta (e.g., merely the difference between the software code revisions, such as the difference between the version currently stored in or executed by the target device and the updated software). In particular, when the number of vehicles receiving the Over-the-Air (OTA) update is large (e.g., at least one million), and/or the size of the update is big, delivering updates as a delta update is an effective mechanism to reduce bandwidth and time. A delta update may comprise a download of only the differential code that has changed (i.e., the "delta"), and not the full code. The necessary full version may then be reconstructed locally using the transmitted delta. As discussed in more detail below, various delta algorithms may be used in order to generate the delta (e.g., the difference between the existing software code and the updated software code).

Thus, the delta update may first be transmitted, and thereafter installed in the electronics resident in the vehicle. However, there may be problems in any one, any combination or all of the transmission, the decryption, the decompression, or the installation of the delta update. As one example, the transmission may be interrupted, resulting in less than all of the update being delivered. As another example, the installation of the delta update may be unsuccessful, resulting in a need to revert to a previous version of the software.

Further, the configuration of the vehicle may complicate the software update in one or more ways. In one way, the vehicle may include various subsystems, each of which may have associated electronics (and associated software executed therein). For example, the vehicle may have the following components: head unit(s); engine control unit(s) (ECUs); sensor(s); and the like. In this regard, the different subsystems may have associated delta updates, so that software may be updated in different parts of the vehicle (e.g., different parts of the vehicle that may be unrelated to one another or different parts of the vehicle that may be related to one another). In another way, the different subsystems of the vehicle may have different priority levels. For example, a first subsystem may be directed to more important functions (e.g., advanced driver-assistance systems (ADAS)) than to a second subsystem (e.g., infotainment subsystem). In that regard, the priority of the subsystems may affect the structure and the procedures for updated the associated software, as discussed further below.

In still another way, the various subsystems may have different capabilities, such as: different processing capabilities (e.g., different computing ability); different memory resources (e.g., a first device, such as a head unit, may have more memory available (such as more volatile memory and/or more non-volatile memory) than a second device, such as a sensor); different security resources (e.g., a first device, such as an ECU, may have hardware, such as an AES decryptor, for decrypting encrypted communication; a second device has sufficient processing and memory capability to perform the decryption; or a third device does not have hardware for decrypting and does not have sufficient processing and memory capability to perform the decryption).

In yet another way, the various subsystems within the vehicle may communicate using multiple networks, such any two, any combination, or all of the following: Ethernet; Controller Area Network (CAN); FlexRay, and LIN (Local Interconnect Network). In still another way, the vehicle may communicate with devices external to the vehicle via multiple wireless connectivity options such any two, any combination, or all of the following: Wi-Fi; 4G LTE; 3G; etc.

When delivering/installing a software update, the following may occur in various devices, including at the server, in transmission, and at the vehicle. For example, on the server side, the server may create the delta (e.g., the update). Creating the delta may include any one, any combination, or all of the following: computing the differences between the current and the desired version (e.g., this may include data differencing or binary differencing); compressing the difference (the result may comprise the compressed delta update); and encryption (e.g. encrypting the compressed delta). Alternatively, the delta may be transmitted uncompressed and simply encrypted. In yet another implementation, the delta may be transmitted compressed but not encrypted. In this regard, any subsequent discussion regarding transmission of the delta (encrypted and/or compressed) may include any one of the disclosed implementations.

Thereafter, in transmission, the encrypted compressed delta may be transmitted using the fastest or a specified network connection (e.g., a network connection as specified by an OEM manufacturer). On the vehicle side, a device in the vehicle (such as an update agent) may create the update image including: decrypting the encrypted delta; decompressing the compressed delta; adding the delta to the existing version in order to obtain the new version of software; and storing the new version of the software (e.g., flashing the new version into non-volatile memory). Alternatively, for an uncompressed delta, the decompression step may be skipped. Likewise, for an unencrypted delta, the decryption step may be skipped.

As discussed above, SOTA/FOTA Updating may be complicated by: multiple vehicle components; varying computing capabilities; multiple networks; and multiple wireless connectivity options. The path to the target device (e.g., the device that is subject to the software update or the device that will execute the software subject to the software update) may be through a connected series of components. For example, vehicle manufacturers may chain these components differently across various vehicle model types, resulting in increased complexity for the update deltas. In particular, various component architectures within the vehicle are contemplated, so that target devices may communicate with an external server via one or more intermediate devices located in the vehicle. Alternatively, the target devices may communicate directly with the server (without the need to communicate with any intermediate device located in the vehicle). Further, connected cars may be increasingly vulnerable to hacking, necessitating a secure transfer of the update to the target device, and further complicating the software update (e.g., encrypted deltas may be decrypted on target devices, with the target devices having varying resources as discussed above).

Faced with these complexities, typical software updates for vehicles use traditional compression schemes. While these traditional compression schemes may be optimal on differencing side (e.g., on the server side), the solutions may not be optimal for automotive use cases and may be particularly inefficient for vehicular OTA updates. In particular, the traditional compression schemes use a one-size-fits-all approach, resulting in a lack of variability and a tailoring to the complexity particular to automotive software updates.

The problems in the transmission and/or installation of the software update (e.g., the delta update used to update the software) and the configuration of the vehicle may thus complicate the software update. Thus, in one implementation, one or more aspects of the software update are adapted based on one or more capabilities (such as computing capabilities, memory capabilities, security capabilities, or the like) of the device or devices that are subject to the update (e.g., the target device). Example aspects adapted based on the capability(ies) of the device include any one, any combination, or all of the following: the delta scheme for the software update; the compression scheme for the software update; the number of divisions of the software update; and the manner in which the software update is decrypted.

In a particular implementation, the software update (e.g., the delta used to generate the software update) selected for transmission may be based on the available resources on a target device and/or on a specified network connection preference (e.g., a specific network connection preferences as requested by an original equipment manufacturer (OEM) to deliver the software update), as discussed in further detail below.

With regard to the available resources on the target device, the delta may be selected based on information transmitted from the target device. The information from the target device may then be used by the server transmitting the delta (e.g., the OTA server) in order to select one or more aspects of the delta used for the software update (e.g., the algorithm to generate the delta; the compression algorithm; or the number of divisions, if any, of the software update; etc.).

The information from the target device may take one of several forms. In one implementation, the information from the target device may comprise any one, any combination, or all of the following aspects of the target device: memory (e.g., the amount of memory available for performing various functions with regard to the software update, such as decompressing the delta and/or reconstructing the image); computational (e.g., the amount of computational capability of the target device, which may affect the time needed to reconstruct the image); and security (e.g., the hardware and/or software capabilities of the target device, which may affect the ability of the target device to decrypt the encrypted delta). For example, the memory of the target device may comprise the amount of memory available (e.g., any one of an indication of scratch memory, volatile memory, or non-volatile memory) for decompressing the delta and/or for reconstructing the image. Thus, in one implementation, the amount of memory of the target device, for purposes of determining the feature(s) of the software update, may be separate from the amount of memory that stores the executable code in flash memory. For example, a target ECU may have dual memory (e.g., separate memory bands comprising a first memory for storing the software and a second memory for storing updates, decompressing updates, and integrating the updates). As another example, the amount of volatile memory in the target device may be used to determine the feature(s) of the software update.

In another implementation, the information regarding the capabilities of the target device may comprise a string value transmitted from the target device. The string value may be generated by the target device and indicate any one, any combination, or all of: the supported delta algorithms (property "A"); the supported compression algorithms (property "B"); the amount of memory (e.g., in megabytes) that is available to the software upgrade (e.g., that is available for the differential application) (property "C"); and the number of divisions for the software upgrade (e.g., send the delta update in a plurality of divisions, such as a first integral division software update and a second integral division software update, with the target device first updating the image with the first integral division software update and thereafter updating the image with the second integral division software update).

The server may determine the available resources on the target device (e.g., the information regarding the capabilities of the target device) in one of several ways. In one way, the server may poll the vehicle (e.g., send a polling communication to the target device directly or a device in communication with the target device, such as the Download Manager Client device, discussed further below). In another way, the target device directly or a device in communication with the target device, such as the Download Manager Client device, may send unsolicited the capabilities of the target device to the server.

Responsive to receipt of the capabilities of one or more aspects of the target device, the server may determine one or more features of the software update. In one instance, the one or more aspects of the target device may affect or determine the delta algorithm used to generate the delta. As discussed further below, the server may have a plurality of delta algorithms from which to select. Responsive to information the server receives regarding the one or more aspects of the target device, the server may select one delta algorithm from the plurality of delta algorithms available. In another instance, the one or more aspects of the target device may affect or determine the compression of the software update. In particular, the memory and/or computational capability of the target device may determine the compression scheme used for transmitting the software update. As one example, a first compression scheme and a second compression scheme may be options for compressing the software update prior to transmission to the target device. The first compression scheme may be more computationally and/or more memory intensive than the second compression scheme. Responsive to determining that the target device has lower memory and/or computational capability (e.g., the memory available for the target device is lower than a predetermined amount of memory and/or the processor or controller on the target device is a certain type of processor or controller, or has a processor clock speed that is less than a predetermined clock speed), the second compression scheme may be selected for compressing the software update. Conversely, responsive to determining that the target device has greater memory and/or computational capability (e.g., the memory available for the target device is greater than the predetermined amount of memory and/or the processor or controller on the target device is a certain type of processor or controller, or has a processor clock speed greater than the predetermined clock speed), the first compression scheme may be selected for compressing the software update.

In still another instance, the one or more aspects of the target device may affect or determine the division of the software update. In particular, the amount of memory of the target device may determine whether the software update is sent in one unitary section, or is divided into sections (such as separate unitary sections) for separate transmission (and potentially separate updating at the target device). As one example, the server may have two options available for transmitting the software update: (i) undivided; or (ii) divided into sections (so that the upgrade of the software is performed piecemeal, section-by-section). In one implementation, the server may determine that the amount of memory available at the target device is smaller than a predetermined size. Responsive to determining that the amount of memory available at the target device is greater than the predetermined size, the server sends the entire software update (after compression and encryption) in a single unitary section to the vehicle. Conversely, responsive to determining that the amount of memory available at the target device is less than the predetermined size, the server may divide the software update into at least two distinct sections, such as a first software update section and a second software update section. The server may then send the first software update section (after compression and encryption) to the vehicle. Thereafter, the server may send the second software update section (after compression and encryption) to the vehicle. Optionally, the server may send the second software update section only after confirmation is received by the server from at least a part of the vehicle (such as a confirmation sent from the target device). The confirmation may be responsive to the target device performing a certain action. As one example, responsive to the target device saving the first software update section into its memory (such as its respective volatile memory), the target device may send a confirmation, indicating the saving of the first software update section in its memory, to the server. In response to receiving the confirmation, the server may send the second software update section. As another example, responsive to the target device flashing the first software update section into its memory, the target device may send a confirmation, indicating the flashing of the first software update section into the non-volatile memory of the target device, to the server. In response to receiving the confirmation, the server may send the second software update section.

In one implementation, the division of the software update, such as into the first software update section and the second software update section, may be dynamically performed. For example, responsive to the server determining that the memory in the target device is less than a predetermined size, the server may divide the software update into the first software update section and the second software update section. Alternatively, the division of the software update, such as into the first software update section and the second software update section, may be performed prior to the server determining the memory available in the target device. For example, responsive to the server determining that the memory in the target device is less than a predetermined size, the server may access the first software update section and the second software update section from a database.

In one implementation, the number of divisions may be based on the memory available at the target device. For example, the server may determine the number of divisions for the software update based on the amount of memory in the target device (e.g., amount of memory available for decompressing the delta and more importantly, reconstructing the image). For example, the server may have a first size of memory, a second size of memory and a third size of memory, with the first size of memory being the largest, and with the second size of memory being in between the first size of memory and the third size of memory. Responsive to determining that the amount of memory in the target device is greater than the first size of memory, the server sends the software update undivided. Responsive to determining that the amount of memory in the target device is less than the first size of memory but greater than the second size of memory, the server sends the software update in two sections. Responsive to determining that the amount of memory in the target device is less than the second size of memory but greater than the third size of memory, the server sends the software update in three sections. Responsive to determining that the amount of memory in the target device is less than the third size of memory, the server sends the software update in four sections.

In yet another instance, the one or more aspects of the target device may affect the decryption of software update in the vehicle. For example, in the event that the target device does not have the memory and/or computational capability to decrypt the software update, a device proximate to the target device (e.g., the device connected to the nearest domain node). As one example, low-computational capacity devices are typically connected to a domain that has more capability to handle the low-computational devices connected to the domain. In this regard, the nearest domain node, which has the memory and/or computational capability to decrypt the software update, decrypts the software update and transmits the decrypted software update to the low-computational device (e.g., the target device). In particular, in the event that a target device, such as an engine control unit (ECU), has no support for security, the decryption is done at another node in the chain (e.g., the closest node in the chain to the ECU) which is powerful enough to decrypt).

As discussed in co-pending in co-pending U.S. patent application Ser. No. 16/287,514 entitled "Broker-based bus protocol and multi-client architecture", incorporated by reference herein in its entirety, hierarchy information may be sent to an eSync Client Module (and in turn to the external server). Specifically, the flat addresses (which include the hierarchy) may be sent to the eSync Client Module (and in turn to the external server). In this way, one or both of the eSync Client Module or the external server may designate the node proximate to the target device that may perform the decryption and/or decompression. As one example, a transmission control module (TCM), which is unable to perform the decryption and decompression, is designated with the following flat address: /gw/ECU2/TCM. Thus, the node closest to the TCM, as indicated by the flat address, is ECU2. In this regard, one or both of the Client Module or the external server may instruct (such as via the manifest) ECU2 to perform the decryption and decompression prior to transmission (either directly or via the broker) to TCM of the decrypted/decompressed software update for installation at the TCM.

Further, in response to determining that a device other than the target device performs the decryption, the operation of at least a part of the vehicle is modified. For example, at least a part of the time during processing of the software update, one or more communication channels, such as the external port(s) to at least one or more devices in the vehicle, are shut down (e.g., closing the port by shutting down any program holding the port open, thereby ceasing communication). In particular, the ports into the device decrypting the software update may be closed after the device decrypts the software update. As one example, during any part of the software update after download, the Download Manager Client (eSync Client) module (such as the master eSync Client Module, discussed below) may exclude access to external devices, such as any external server. For example, the eSync Client Module may cause ports, such as one, some, or all ports to communicate with external devices, to temporarily refuse acceptance and/or to temporarily buffer incoming communications (without transmitting the communications internally) until the decrypted software update is transmitted and stored in the target device. After a predetermined action (such as after the target device receives the unencrypted software from the eSync Client Module or after the target device flashes the unencrypted software), the communication channels may be controlled to resume communication.

In the example where the capabilities of the target device are included in a string value with different properties, with regard to the supported delta algorithms (property "A"), the target device may indicate which delta algorithms it supports. As discussed above, various delta algorithms may be used to define the difference between the current version of the software (resident in the target device) and the software update. Example delta algorithms may include: BSDiff algorithm (as defined in http:/www.daemonology.net/bsdiff/); VCDiff algorithm (as defined in https:/www.tools.ietf.org/html/rfc3284); ESDiff (which is the BSDiff algorithm combined with Lempel-Ziv-Markov chain algorithm (LZMA)). Other delta algorithms are contemplated.

With regard to the supported compression algorithms (property "B"), the target device may likewise indicate which compression algorithms it supports. Example compression algorithms include, but are not limited to: Gzip compression (as defined in https://tools.ietf.org/html/rfc1952); Bzip2 compression (which uses the Burrows-Wheeler algorithm); and LZMA compression (which is a dictionary compression algorithm whose output is then encoded with a range encoder). Other compression algorithms are contemplated.

With regard to the amount of memory (property "C"), this single value property may specify the amount of memory, such as in megabytes, that is available for the delta algorithm (e.g., the differential application). In one implementation, the delta algorithm and the compression algorithm should not produce a delta that requires more memory than the amount of memory as indicated in property "C". In an alternate implementation, responsive to the server determining that the delta requires more memory than the amount of memory as indicated in property "C", the server may divide the delta into divisions (such as into two integral divisions, three integral divisions, etc.), with each of the divisions being no more than the memory as indicated in property "C" (and being integral so that the partial update may be performed for the respective division).

Alternatively, or in addition, the target device may send information to the server regarding the current image details (e.g., the current software version resident in the target device, such as version 1.0). Responsive to this information, the server may use the selected delta algorithm in order to generate the delta (e.g., software update is version 3.0 and current version, as reported by the target device is version 1.0; delta generated is the difference between version 3.0 and version 1.0). The target device may likewise send information to the server regarding network connectivity. Network connectivity may indicate the network through which the software update is to be transmitted. Responsive to this information, the server may select the network, as indicated by the network connectivity information, in order to transmit the delta.

Thus, as discussed above, the target device may send information to the delta generator server. The target device may send any one, any combination, or all of the following: amount of non-volatile memory available; amount of volatile memory available (such as buffer memory available for the software upgrade); processing capability; encryption capability; current software version (e.g., an indication of the current version of the software in order for the delta generator server to determine the difference); sectorsize (e.g., flash memory may be divided into sectors and the code may use that sector length as the unit of code size); and sector delay (e.g., sector delay may include how a size or many sectors the target device would compile before target device is configured to write it back into memory (e.g., volatile or non-volatile memory), such as if there are four sectors in the memory to recreate the new update, the sector delay is four sectors. In this regard, sector delay is indicative of the amount of sectors in memory that are computed before restoring it back in place); available compression schemes; bandwidth of the bus (e.g., bandwidth of the bus is the clock speed used; for example, CAN is available in many speeds, such as starting at 250 Khz to 1 MHz, equivalently one can say 250 kbits or 1 Mbit/second; LIN is significantly slower; LAN or Ethernet is available at 100 Mbits or 1 Gbit, etc.; FlexRay is 5-10 Mbits/second). Alternatively, a device other than the target device may send the information to the delta generator server.

Figure 10:
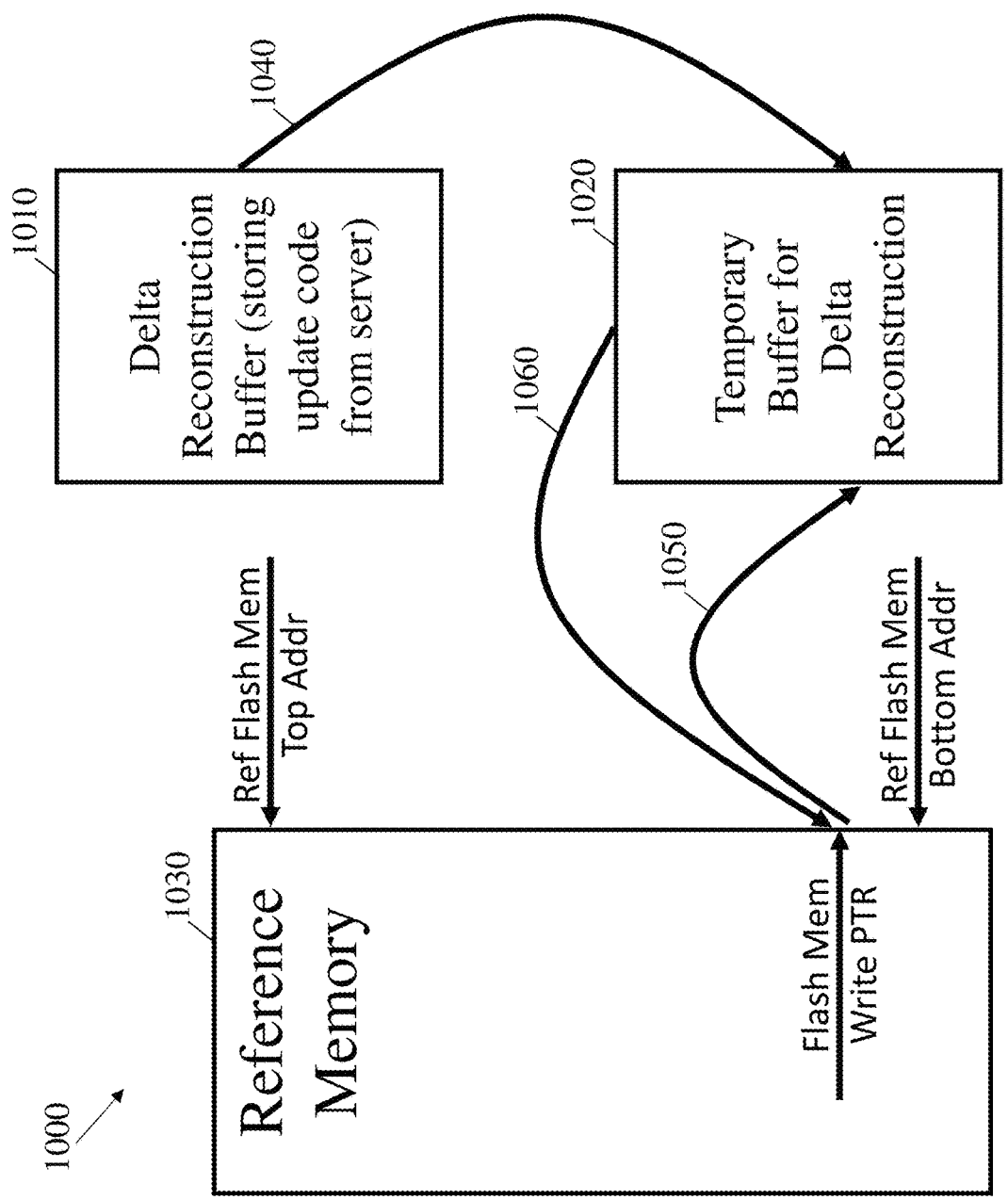
FIG. 10 is a flow diagram of an in-place replacement update of adaptive delta update process for the in-vehicle client.

FIG. 10 is a flow diagram of an in-place replacement update of adaptive delta update process for the in-vehicle client. In one implementation, sections for the delta update may be dynamically changed based on the sections sent, which may start at section 0. Further, the division of the sections may also change responsive to the changes in the section size. In particular, FIG. 10 illustrates the delta reconstruction process in the decoder of the target device. In one implementation, the decoder is in sync with the encoder (which may be resident on the server). The encoder may verify the decoding process even before transmission to the in-vehicle deconstructor. In one example, flash memory in the target device may be segmented into sectors, with the unit of replacement for the delta update into the memory being measured in sectors. In particular, depending on the flash memory configuration, a sector may have 2K to 4K bytes in size. The reconstruction memory buffer may be an integral number of sectors, which may comprise the sector delay (as discussed above). For example, the sector delay may comprise the time between write-backs into reference memory. This write-back may be dependent on the integral sectors in the temporary buffer 1020 being written. This sector delay feature, which delays the overwriting of reference memory 1030 with the update, may thus allow for a greater search area for the reconstruction in the reference memory 1030. Specifically, as discussed above, areas of reference memory may be used for the delta update. Prior to the update, the entire reference memory may be used for the delta update. Thereafter, the portion of reference memory available for use in the delta update is reduced when the update from the reconstruction buffer is written back to reference memory. Specifically, with regard to in-place replacement, in the reconstruction inside the decoder, the reference memory 1030 is erased and written in-place to create the new code update. This may be illustrated based on one or more pointers, such as ref flash memory top address and flash memory write PTR. Before any of the update is written to reference memory 1030, the flash mem write pointer may point to the lowest address of the reference memory. In this regard, the memory between the flash mem write PTR and the ref flash mem to address indicates that the entire reference memory may be used for the delta update. As the update is written into reference memory 1030, flash mem write PTR is moved (to point to the address just above where the last write to reference memory has occurred). In this way, the amount of reference memory available for use with the delta update is reduced, and is indicated by the movement of flash mem write PTR.

In practice, delta updates from server may first be written into a delta reconstruction buffer 1010 and then transferred to temp buffer (shown as arrow 1040). Further, temporary buffer 1020 copies the original code from reference memory 1030 (shown as arrow 1050) and then creates a new partial code image reconstructed based on the instructions associated with the code in delta reconstruction buffer. Thereafter, the temporary buffer 1020 is computed it is written back into the reference memory 1030 (shown as arrow 1060).

The data from server database 912 may include DB data, which may comprise the update image (e.g., the software update), the content, and the data type. The data type may be indicative of the ability to compress the data. Typical image formats are ECU binaries arm 32/64 bit, Head Unit binaries, Android, Linux and QNX operating system files and drivers, application packages, navigation map files, XML files etc."

As discussed in more detail below, the Download Manager Client Module may be separate from a target device (e.g., separate from the ECU, TCU or head unit). The Download Manager Client Module may comprise a software module, a hardware module, or a combination software/hardware module. Alternatively, the Download Manager Client Module may be integrated with the target device.

Separate from the Download Manager Client Module, one, some, or all of the target devices may have an update agent. In practice, the Download Manager Client Module may forward the software update to the respective update agent. After which, the update agent may be configured to store (e.g., flash) the software update in the respective target device. The update agent may be configured to support the software upgrade and installation (e.g., automated patch delivery and installation) and may perform any one, any combination, or all of: receive the software update; decrypt the software update; decrypt the software update; and install the software update. In instances where the software update is divided into sections, the software update may manage the process, including receiving an indication as to the section of software to use with the delta to recreate the image of the software in memory and installing the recreated image into the volatile and/or non-volatile memory. As discussed below, certain devices have an update agent instantiated within. In this regard, these certain devices may perform the installation of the software upgrade. Alternatively, other devices do not have an update agent instantiated within. In this instance, these other devices may rely on an update agent instantiated in a nearby node to perform any one, any combination or all of decryption, decompression, recreation of the image prior to saving of the software upgrade in the target device.

Referring to the figures, FIG. 1A illustrates a block diagram 100 of functional devices within a vehicle and a proprietary bus interconnecting the functional devices. As discussed above, one example system comprises an in-vehicle system. Alternatively, other types of systems, such as for a building, are contemplated. In that regard, the discussion with regard to the in-vehicle system may likewise be applied to other types of systems.

As shown, vehicle 110 includes eSync Client Module 112, policy 114, status 116, gateway (GW)+Certificate Management 118, broker 120, and one or more ECUs (such as ECU 1 (130), ECU 2 (132), ECU 3 (134), and ECU N (136). Though 4 ECUs are depicted in FIG. 1A, fewer or greater numbers of ECUs are contemplated. eSync Client Module 112 and ECU 1 (130), ECU 2 (132), ECU 3 (134), ECU N (136) are examples of eSync agents, which may communicate with broker 120. The various eSync agents may communicate via one or more types of buses. In one implementation, one, some or all of the buses in vehicle 110 communicate via a proprietary type of bus protocol, such as the eSync bus protocol. As discussed in further detail below, broker 120 may comprise the intermediary through which devices, such as eSync Client Module 112 and the one or more ECUs communicate. As shown, eSync Client Module 112 may communicate with other electronic devices (not shown) via cloud 102. As discussed further below, the other electronic devices may comprise servers, such as command servers or software update serves, in order to control various electronic devices in vehicle 110.

One, some, or all of blocks depicted in FIG. 1A may comprise functional blocks configured to perform a function. As one example, broker 120 may comprise a functional block configured to perform the broker functionality, as discussed in more detail below. In this regard, in one implementation, the broker 120 may reside in an electronic device within vehicle 110 that further houses other functional blocks. As another example, a same electronic device (such as a gateway server resident in the vehicle) may execute the functionality for both the broker 120 and eSync Client Module 112. In one implementation, the same electronic device may execute multiple processing threads, with different processing threads for executing the broker functionality and the eSync Client Module functionality, respectively.

One, some, or all of the functional blocks (including eSync Client Module 112, broker 120, and ECUs) depicted in FIG. 1A may include any one, any combination, or all of: (1) a certificate for verification of the functional block (e.g., the certificate may establish the origin of the respective functional block to validate the functional block by another functional block); (2) a private key for the functional block, with the private key being generated by the same entity that generate the certificate in (1); and (3) a trust anchor or authority that verifies authentication for other participants (e.g., functionality to verify certificates of other functional blocks).

Various types of communication are contemplated. As one example, a Transport Layer Security (TLS) session is contemplated. To use TLS, one uses key/trust/cert for each client, which is also used in the eSync Protocol security setup, as discussed further below. TLS may not support situations where a middle man-type device can be used, such as the broker 120, as discussed below. TLS (or other security established by the eSync client) may only support peer-to-peer security, and in this case peers communicate over the broker 120, and TLS, as such, cannot be used. Further, the arrangement illustrated in FIG. 1A includes TLS maintained between cloud 102 and eSync Client Module 112, while eSync Client Module 112 may communicate via a different cryptographic protocol to other elements within vehicle 110, such as communicating with ECUs using a symmetric key (e.g., AES Encryption).

As discussed further below, one, some, or all of the devices within vehicle 110 may establish a channel with the broker 120. For example, one or both of the ECUs or eSync Client Module 112 may establish an individual channel to broker 120, which may already be provisioned in the component prior to installation. Prior to establishing a channel, validation of at least one party (or both parties) to the channel are validated. In particular, one, some, or all of the devices in vehicle 110 may be provisioned with a certificate (such as provisioned with a certified upon manufacture). One, some, or all of the devices in vehicle (except for broker 120) may include information to communicate with broker 120 (such as a default address of broker 120), which may be used to register with broker 120. As discussed in further detail below, during registration and in order to establish a channel, the broker 120 and the electronic device, such as ECU 1 (130) or eSync Client Module 112, may perform mutual validation. For example, broker 120 may request (or receive unprompted) from the electronic device the electronic device's certificate, and validate the certificate of the electronic device as indicating that the electronic device is allowed to communicate via the broker. Likewise, the electronic device may request (or receive unprompted) from the broker 120 the broker's certificate, and validate the certificate of broker 120 as indicating that broker 120 is allowed to communicate via the electronic device.

Thereafter, subsequent to registration, the channel may be established. Various security measures may be established for the respective channels, such as by generating a random session key for the electronic device registered with broker 120, with subsequent communications for the channel via broker 120 for the electronic device (either as a sender or a recipient) using the session key. For example, the ECUs may be preprogrammed (via a programmed address for the broker 120 (e.g., a configured port address and IP address of broker 120), discussed below) to communicate with the broker 120 in order to establish the channel. Once the channels are established, any devices with a respective channel may exchange information via the broker 120 using the eSync bus protocol. As one example, the eSync Client Module 112 and one, some or all of ECU 1 (130), ECU 2 (132), ECU 3 (134), and ECU N (136) may exchange information. In this regard, any two components that have established channels via the eSync bus protocol may exchange information.

Figure 3:
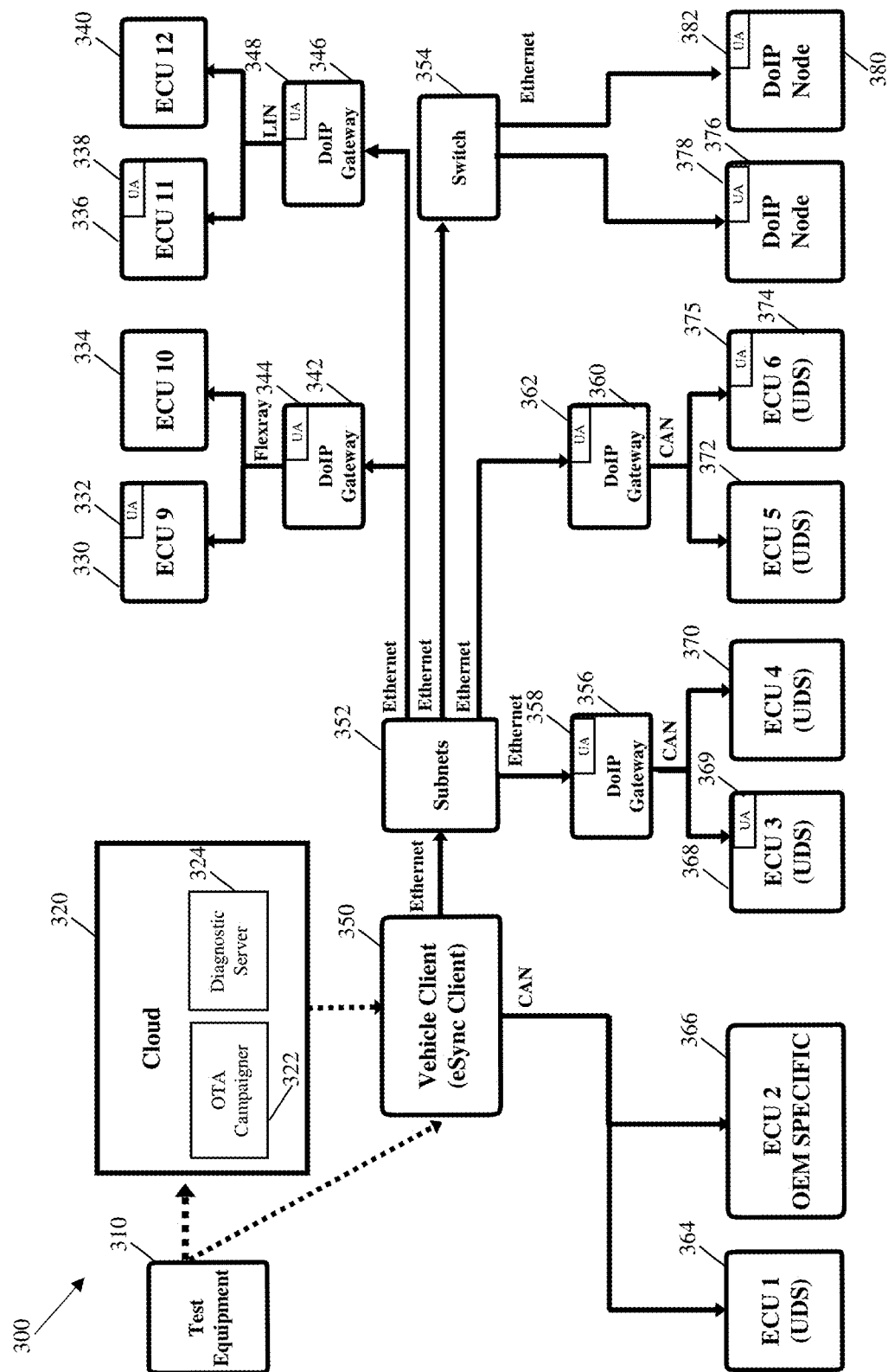
FIG. 3 illustrates a third block diagram of device interconnect in next generation in-vehicle architecture for updating software in a vehicle.

Further, even though FIG. 1A does not illustrate an update agent, an update agent may be present in vehicle 110, such as present in an eSync Client Module, an ECU or in a gateway (see FIG. 3). One, some, or all update agents in the vehicle may be associated with a default group membership for exchanging messages (e.g., unique addresses). One, some or all eSync agents are provided with a respective certificate during instantiation and the respective eSync agent may be assigned membership subscription as indicated by the respective certificate associated with the respective eSync agent. This membership defines which type of messages on the bus the node associated with the respective eSync agent is privy to. Further, as discussed below, membership to groups may be changed (added or deleted) for a respective eSync agent based on changing the respective certification for the respective eSync agent (e.g., using GW+Certificate Management 118). In practice, broker 120 may know how to route messages to specific groups, but does not have the capacity to decipher messages being routed. In this regard, the messages are transparent to broker 120. Thus, the configuration may appear similar to the Application level VLAN, which is agnostic to the physical interfaces, and provides isolation, such as to different bus types (e.g., USB, Ethernet, CAN). The broker may simply act as a post office, directing the messages it receives to the specific addresses (e.g., broker 120 may parse a message it receives, identify one or more eSync agents to receive the messages, and then route the message to the identified one or more eSync agents. Further, there is no need for multicast as Groups can be used to listed to specific addresses. The broker may examine a message in order to determine all the devices that are entitled to receive the message, and then route the message to the determined devices.

In a specific implementation, security for the channel may comprise SSL/TLS security. In particular, SSL/TLS uses a combination of public key and symmetric-key encryption. Symmetric-key encryption is much faster than public-key encryption, but public-key encryption provides better authentication techniques. An SSL/TLS session may begin with an exchange of messages called the SSL handshake, with the initial communication between the server and client. The handshake thereby allows the server to authenticate itself to the client using public-key techniques, then allows the client and the server to cooperate in the creation of symmetric keys used for rapid encryption, decryption, and tamper detection during the session that follows. Key-exchange algorithms like RSA and Elliptic Curve Cryptography (ECC) govern the way the server and client determine the symmetric keys to use during an SSL session. The most common SSL cipher suites use RSA key exchange, while TLS supports ECC cipher suites as well as RSA. A Certificate System supports both RSA and ECC public-key cryptographic systems. Thus, a security key may be established using RSA between any two connection points.

In one implementation, in-vehicle network nodes may share Encrypted Payload using AES. The key is symmetric and is shared for a session ahead of time only between verified nodes. The session key may be valid for a predetermined amount of time or during a predetermined event (e.g., lasting for 24 hours after creation or for the time between engine power ups). The TLS session may be established between Server and eSync Client Module. Further, HMAC+AES may be used to sign and encrypt payload inside the vehicle. In this regard, a device may encrypt the payload and sign the payload.

As illustrated in FIG. 1A, each connection to the broker is an independent connection. A specific device's membership (such as an ECU's membership) with broker 120 may be established through the use of assigned certificates during configuration or initial flash prior to insertion into network. In this regard, the different channels between the broker and respective devices represent logical independent connections.

Separate from establishing the channels between respective electronic devices and broker 120 (such as a first channel between eSync Client Module 112 and broker 120, a second channel between ECU 1 (130) and broker 120, etc.), validation to send and/or receive the communication may be performed. As one example, the sender of the communication may be validated prior to a device (such as broker 120) allowing the sending of the communication. In particular, a sender, such as eSync Client Module 112 or ECU 1 (130), may seek to send a communication. Prior to sending the communication, another device, such as broker 120, may determine whether to authorize the sending of the communication. In one implementation, broker 120 may perform the authorization. Further, in one implementation, the authorization (such as performed by the broker 120) may take one of several forms including any one, any combination or all of: (i) determining whether the sender is generally authorized to send a communication; (ii) determining whether the sender is authorized to send a type of communication (such as an alert communication, a software update communication (e.g., a software delta), etc.); (iii) determining whether the sender is authorized to send a communication to a specific recipient (e.g., whether eSync Client Module 112 is authorized to send a communication to ECU 1 (130)); and/or (iv) determining whether the sender is authorized to send a communication to a type of recipient (e.g., whether eSync Client Module 112 is authorized to send a communication to any type of ECU). Responsive to the authorization of the sender, the broker 120 may send one or more aspects of information to the sender. For example, in response to the broker determining that the sender is authorized to send a communication to a specific recipient, the broker 120 may send a certificate associated with the specific recipient. Thereafter, the sender may communicate, via the broker 120, in order to validate itself to the specific recipient. Further, in one implementation, the specific recipient may likewise communicate, via the broker, in order to validate itself with the sender. As another example, in response to the broker determining that the sender is authorized to send a communication to a type of recipient, the broker 120 may determine all of the devices that are of that type (e.g., all devices that are ECU) and send the certificate(s) and optionally the listing of all of the devices of that type (e.g., a listing of all the ECUs currently registered in the vehicle).

Alternatively, or in addition, the recipient of the communication may be validated prior to a device (such as broker 120) allowing the receipt of the communication. In particular, a recipient, such as eSync Client Module 112 or ECU 1 (130), may be indicated recipient of a communication that broker 120 is tasked to route. Prior to broker 120 routing the communication sent from sender, broker 120 may determine whether the indicated recipient is authorized to receive the communication. In one implementation, the authorization performed by broker 120 may take one of several forms including any one, any combination or all of: (i) determining whether the recipient is authorized to generally receive a communication; (ii) determining whether the recipient is authorized to receive a type of communication (such as an alert communication, a software update communication (e.g., a software delta), etc.); (iii) determining whether the recipient is authorized to receive a communication from a specific sender (e.g., whether ECU 1 (130) is authorized to receive a communication from eSync Client Module 112; and/or (iv) determining whether the recipient is authorized to receive a communication from a type of sender (e.g., whether ECU 1 (130) is authorized to send a communication from any type of eSync Client Module).

In practice, one electronic device subject to the information exchange (such as the eSync Client Module 112) may use a key (such as a random key (e.g., session key) which is not initially known to the other electronic device subject to the information exchange (e.g., ECU 1 (130), ECU 2 (132), ECU 3 (134), and ECU N (136)). So that, any electronic device (or both of the electronic devices) subject to the information exchange (e.g., ECU 1 (130), ECU 2 (132), ECU 3 (134), and ECU N (136)) may send a request to the other electronic device (e.g., eSync Client Module 112) to provide its public key (e.g., eSync Client Module provides its public key). As one example, only one device of the two devices may be validated in order to generate the session key. For example, the requesting device (e.g., an ECU) may verify the origin of the provided key (e.g., verify the origin of the eSync Client Module provided public key). Responsive to the verification, the requesting device (e.g., the ECU) may then send the session key using the Public key of the requesting device. As another example, both devices may be validated in order to generate the session key. In a specific example between an ECU and the eSync Client Module 112, one of the ECU or the eSync Client Module 112 may send the initial communication to the other device to establish the session key. After validation of the key by the other of the ECU or the eSync Client Module 112, the other of the ECU or the eSync Client Module 112 may then send its key to the one of the ECU or the eSync Client Module 112 for validation. After which, the session key may be generated.

In this regard, respective session keys may be established for each independent connection. For example, a first session key may be established from eSync Client Module 112 to ECU 1 (130), a session key may be established from eSync Client Module 112 to ECU 2 (132), a third session key may be established from eSync Client Module 112 to ECU 3 (134), etc.

Thus, the session key, valid only until a predetermined amount of time and/or even. In this regard, the session key is not simply exchanging keys amongst different devices in the vehicle 110. Rather, generating the session key involves a specific process of handshaking/validation amongst the different devices. As one example, if ECU 1 (130) seeks to communicate (e.g., receive and/or send messages) with eSync Client Module 112, ECU 1 (130) may send a message to broker 120, with the message indicating to broker 120 that ECU 1 (130) wishes to communicate with eSync Client Module 112. In one implementation, the message from ECU 1 (130) may include the certificate of ECU 1 (130). In response to receiving the message, broker 120 forwards the certificate for ECU 1 (130) to eSync Client Module 112. In response to the forwarded message, eSync Client Module 112 reviews the certificate of ECU 1 (130) and determines if the certificate is valid to receive messages from eSync Client Module 112. As one example, after broker 120 authorizes eSync Client Module 112 and ECU 1 (130) for registration, broker 120 simply acts to route communications between eSync Client Module 112 and ECU 1 (130) (and optionally may route keys to devices in vehicle 110). In particular, eSync Client Module 112 may access the key (e.g., the public key) of ECU 1 (130) (e.g., that ECU 1 (130) forwarded to broker 120) and then generates a random session key and send it back to the ECU 1 (130) (via the broker 120). Thereafter, communications that are encrypted with the public key of ECU 1 (130) can be decoded by ECU 1 (130). In this regard, there's a division of labor whereby broker 120 acts as the router but does not perform the certification analysis based on the ECU 1 (130) public key, whereas eSync Client Module 112 does not perform routing but does perform the certification analysis and does generate the session key based on the public key of ECU 1 (130).

Figure 1B:
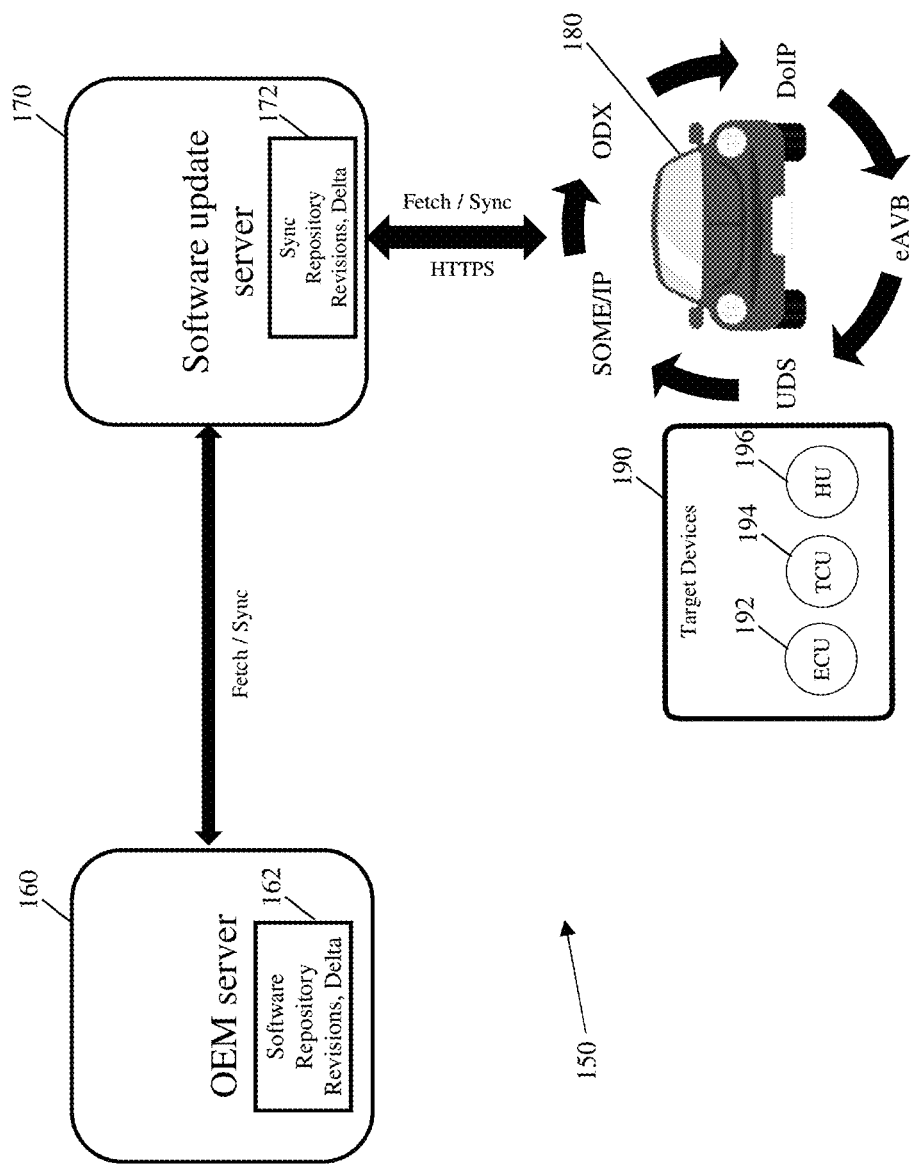
FIG. 1B illustrates a first block diagram of devices for updating software in a connected vehicle.

FIG. 1B illustrates a first block diagram 150 of devices for updating software in a vehicle. Specifically, FIG. 1B illustrates an OEM server 160 with a software repository of revisions (e.g., delta updates) 162. The OEM server 160 is in communication with software update server 170 such as in order for the software update server to fetch updates (e.g., delta updates) or sync with the OEM server 160. After synching, software update server 170 includes a synched repository of revisions (e.g., delta updates) 172.

Software update server 170 communicates with vehicle 180 via wired and/or wireless protocols, such as via HTTPS. Further, as discussed in more detail below, various electronic devices within the vehicle 180 may communicate with one another. One type of electronic device is the target device(s) 190, which is/are the device(s) subject to the software update. Examples of the target device(s) 190 include, but are not limited to, engine control unit (ECU) 192, telematics control unit (TCU) 194, and/or head unit (HU) 196. Other devices subject to software updates are contemplated. Within the vehicle, communications may use one or more protocols, such as eVAB (Ethernet Audio Video Bridging), DoIP (Diagnostics over IP), ODX (Open Diagnostics eXchange), SOME/IP (Scalable service Oriented MiddlewarE over IP), or UDS (Unified Diagnostic Services). Other communication protocols are contemplated.

Figure 2:
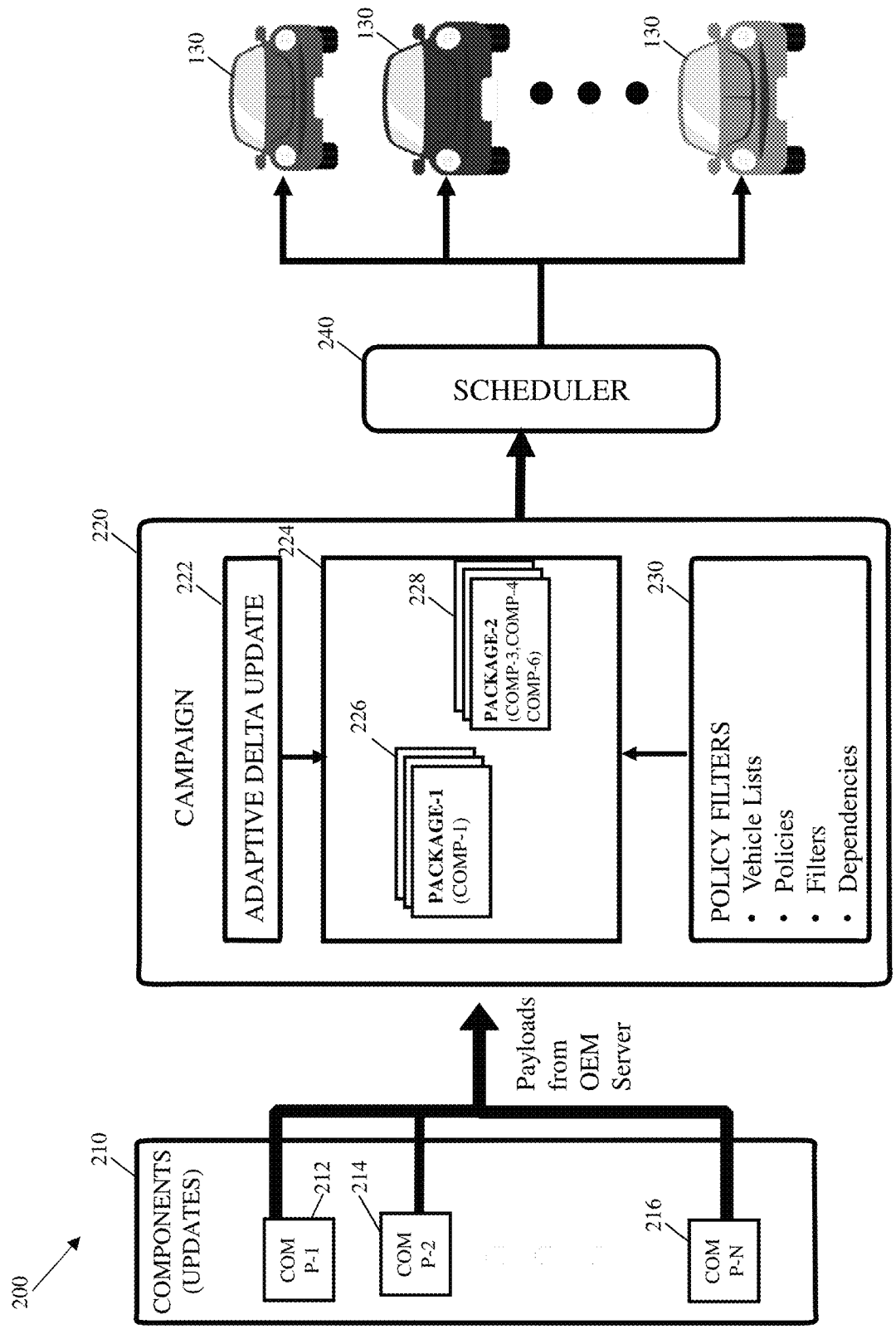
FIG. 2 illustrates a second block diagram of devices for updating software in a vehicle.

FIG. 2 illustrates a second block diagram 200 of software components used for updating software in a vehicle. In particular, the software updates may comprise various components 210 (such as updates) in the form of component (COM) P-1 212, COM P-2 214, COM P-N 216. Any number of components are contemplated. The components may be transmitted to a campaign block 220, which may schedule the various components for update on the vehicles 180. Specifically, adaptive delta update 222, discussed further below, may organize one or more packages (package 1 226, package 2 228, etc.), and using policy filters (such as vehicle lists, policies for updates, filters, and dependencies), perform the scheduling of the updates using scheduler 240.

FIG. 3 illustrates a third block diagram 300 of devices for updating software in a vehicle. Test equipment 310 may communicate directly with cloud 320 and/or vehicle client 350. Cloud 320 may include over-the-air (OTA) campaigner 322, configured to manage the over-the-air updates, and diagnostic server 324, configured to monitor the software updates and diagnose and/or correct failures in the software updates.

Vehicle client 350 is configured to interface with various systems in the vehicle. For example, vehicle client 350 may communicate directly with certain vehicle devices via a Controller Area Network (CAN) bus. As illustrated in FIG. 3, vehicle client 350 communicates with ECU 1 (364) and ECU 2 (366) via the CAN bus. Various types of ECUs are contemplated, such as a Uniform Diagnostic Service (UDS) compliant ECU and/or an OEM specific ECU.

Alternatively, or in addition, the vehicle client 350 may communicate with other devices within the vehicle via subnets 352. Specifically, subnets 352 may communicate with one or more gateways, such as DoIP gateways 342, 346, 356, 360, via Ethernet. Each of the DoIP gateways 342, 346, 356, 360 may have update agents (UA) 344, 348, 358, 362. Update agents may be used to implement the software update in a device. For example, ECU 9 (330) includes update agent 332, and thus need not use update agent 344 in DoIP gateway 342. However, ECU 10 (334) does not include an update agent, and may thus rely on update agent 344 in DoIP gateway 342 to perform a software update for software resident in ECU 10 (334). Similarly, ECU 11 (336) includes update agent 338, but ECU 12 (340) does not, instead relying on update agent 348 in DoIP gateway 346 to perform a software update for software resident in ECU 12 (340). Likewise, ECU 3 (368), which includes update agent 369, and ECU 4 (370), which does not include an update agent, communicates via the CAN bus with DoIP Gateway 356. ECU 5 (372) and ECU 6 (374), which includes update agent 375, communicates via the CAN bus with DoIP Gateway 360. Finally, DoIP node (376), which includes update agent 378, and DoIP node (380), which includes update agent 382, communicates via Ethernet with Switch 354. Though broker is not illustrated in FIG. 3, broker may be present in various blocks illustrated, such as in DoIP gateway 342, 346, 356, 360. In this regard, the functionality ascribed to broker may likewise be implemented in a system as illustrated in FIG. 3.

Figure 4:
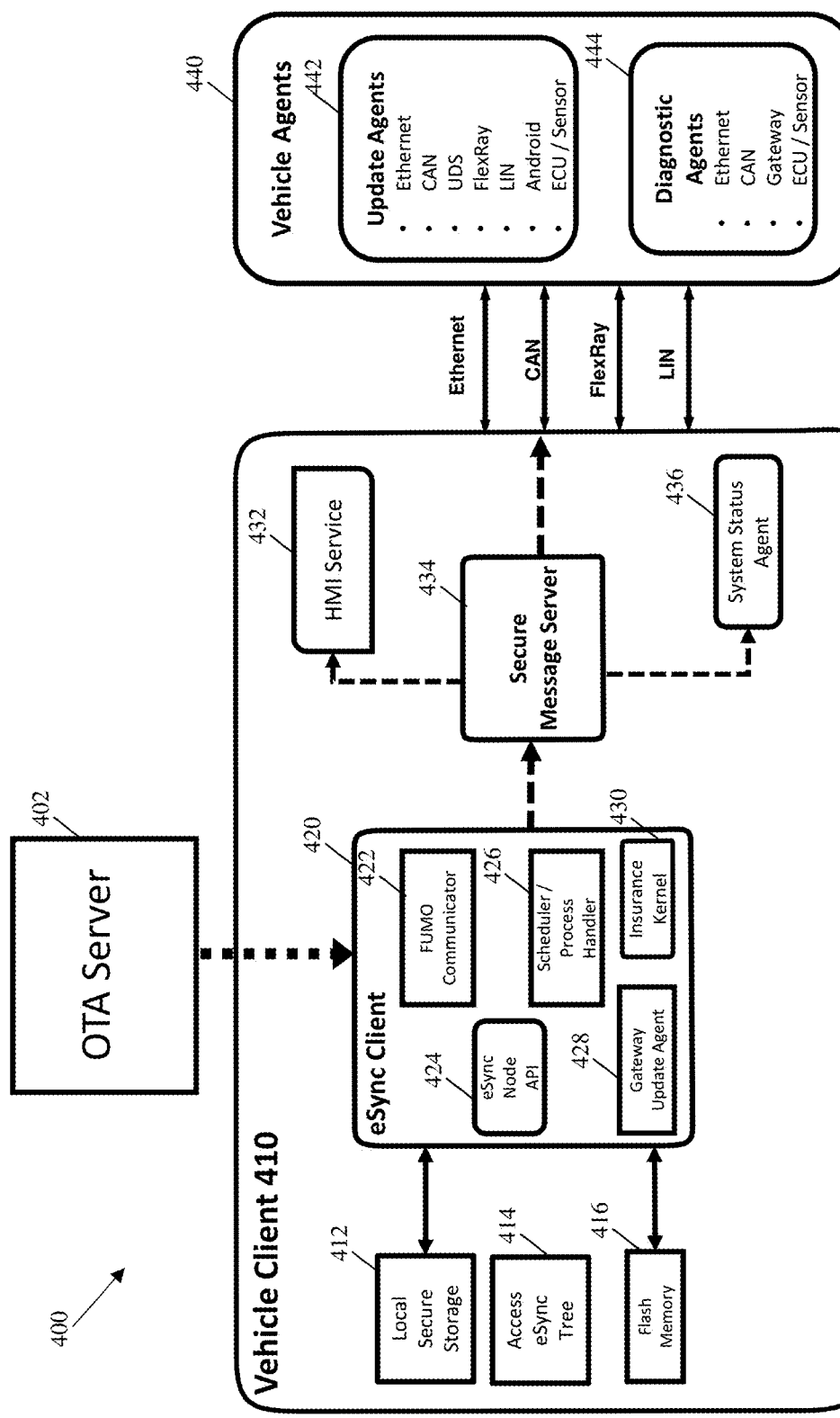
FIG. 4 is a first block diagram of an in-vehicle Server, Client and Agent architecture.

FIG. 4 is a first block diagram 400 of in-vehicle gateway components. In particular, OTA server 402 communicates with vehicle client 410. Vehicle client 410 may comprise Download Manager Client Module (eSync Client Module) 420, local secure storage 412, access eSync tree 414, flash memory 416, HMI service 432, secure message server 434, and system status agent 436.

eSync Client Module 420 comprises various sub-elements including FUMO communicator 422, DM node API 424, schedule/process handler 426, gateway update agent 428, and insurance kernel 430. Vehicle client 410 communicates with vehicle agents 440, including update agents 442, and diagnostic agents 444. Though broker is not illustrated in FIG. 4, broker may be present in various blocks illustrated, such as in vehicle client 410.

Figure 5:
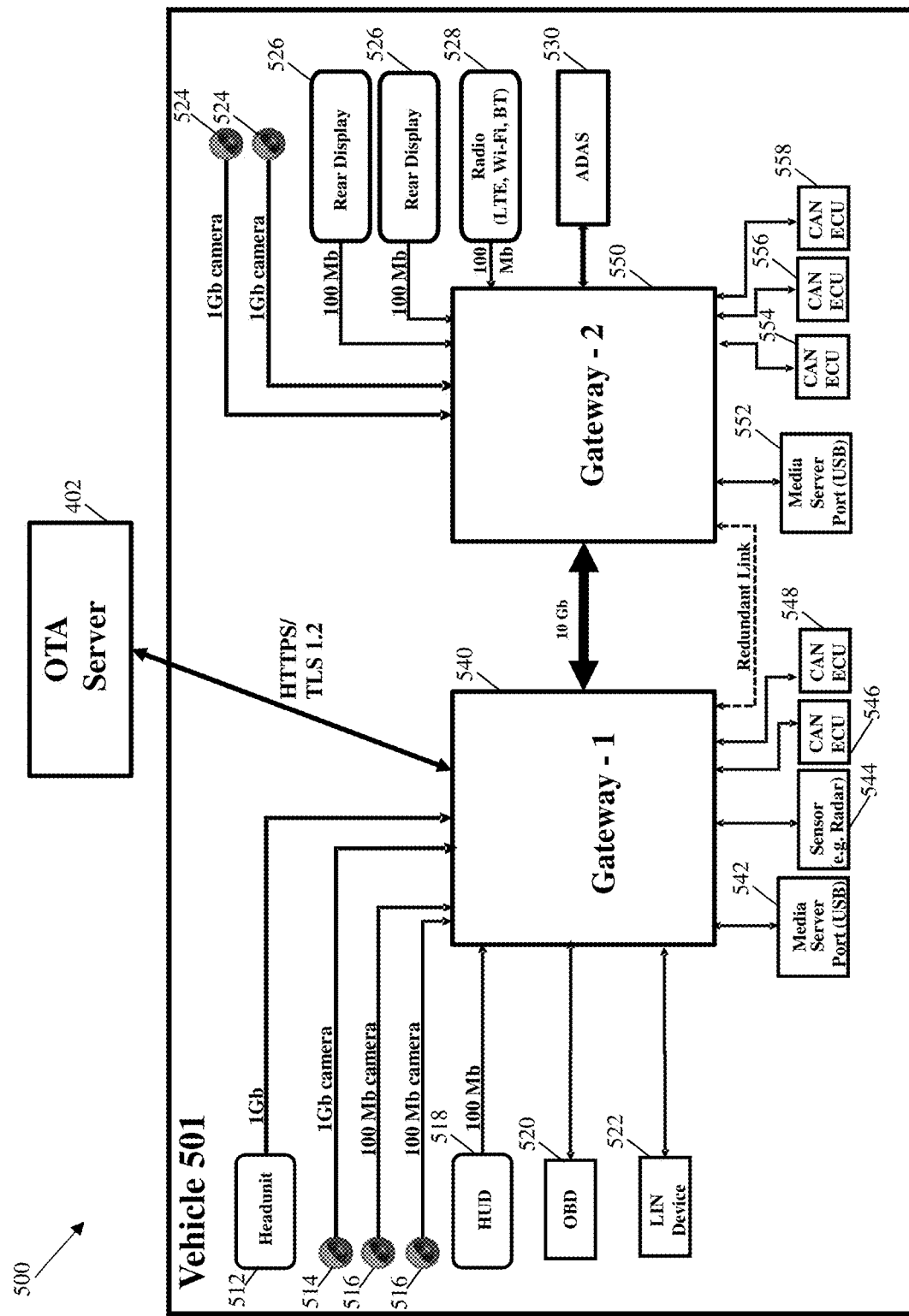
FIG. 5 is a second block diagram of an in-vehicle network architecture using multiple gateways.

FIG. 5 is a second block diagram 500 of a network architecture using multiple gateways. OTA server 402 communicates with various components within vehicle 501, including Gateway-1 (540). In this regard, Gateway-1 (540) acts as a conduit to the OTA server 402, relaying communications to different devices, such as Gateway-2 (550). Various devices with vehicle 501 may communicate with Gateway-1 (540) including: headunit 512, 1 Gb camera 514, 100 Mb cameras 516, heads-up display (HUD) 518, on-board diagnostics (OBD) 520, local interconnect network (LIN) 522, media server port (for USB) 542, one or more sensors (e.g., for Radar) 544, and one or more CAN ECUs 546, 548.

Likewise, various devices with vehicle 501 may communicate with Gateway-2 (550) including: 1 Gb cameras 524, 100 Mb displays configured to receive a rear image (e.g., for a backup camera) 526, radio 528, Advanced Driver Assistance Systems (ADAS) 530 (e.g., adaptive cruise control, blind spot detection, collision avoidance systems, forward collision warning, etc.), media server port (for USB) 552, and one or more CAN ECUs 554, 556, 558. Though broker is not illustrated in FIG. 5, broker may be present in various blocks illustrated, such as in gateway-1 (540) and/or gateway-2 (550).

FIG. 5 may be divided into a multi-client architecture, such as disclosed in US patent application Ser. No. 16/278,514 entitled "Broker-based bus protocol and multi-client architecture", filed on the same date as the present application, and incorporated by reference herein in its entirety, and may thus update the software in the different domains based on the multi-client architecture disclosed therein.

Figure 6:
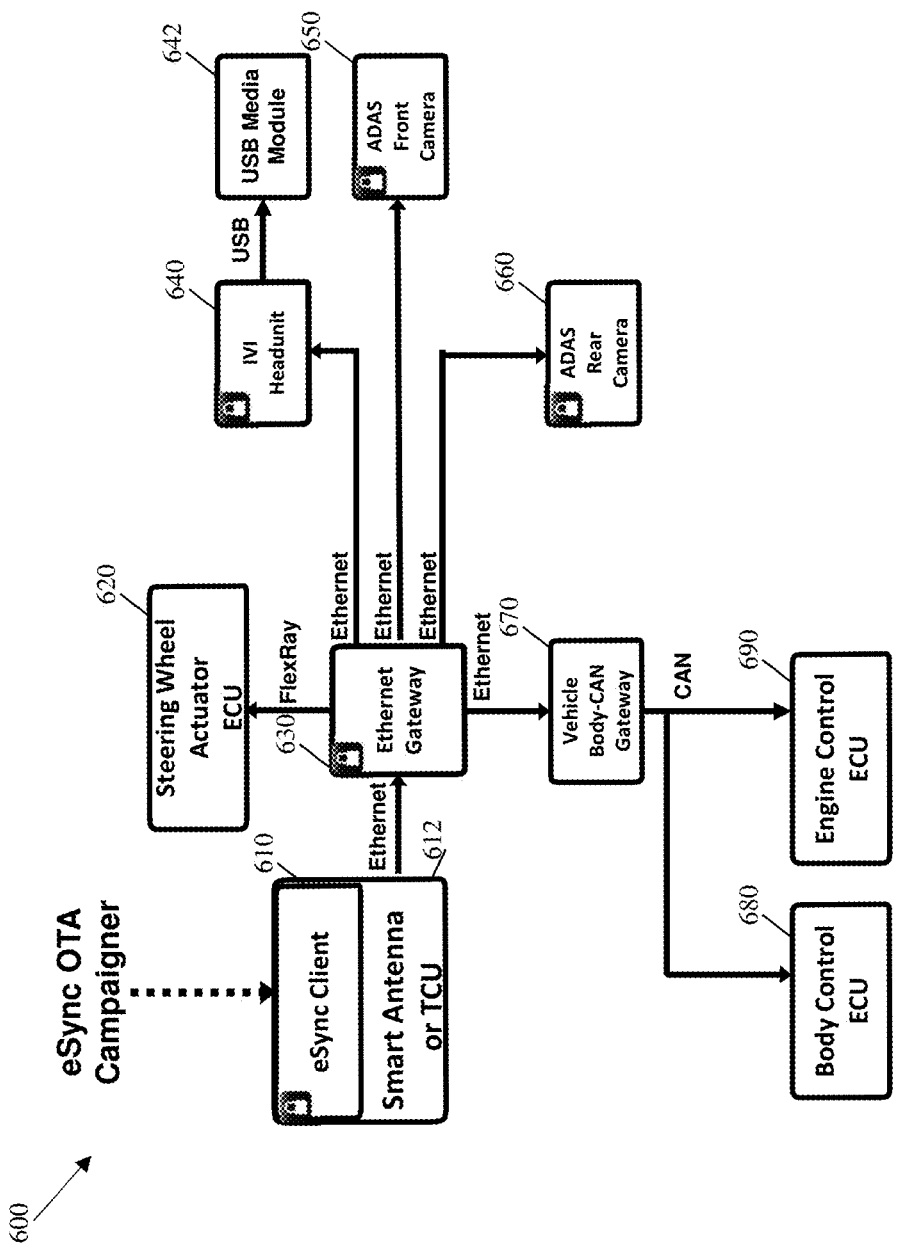
FIG. 6 is a third block diagram of an in-vehicle gateway with interconnected ECUs for next generation vehicle such an electric vehicle.

FIG. 6 is a third block diagram 600 of an in-vehicle gateway for an electric vehicle. Download Manager Client Module (eSync Client Module) 610 may be placed in any high computing ECU in a connected network, such as being integrated with another electronic device within the vehicle (e.g., incorporated into smart antenna or telematics control unit (TCU) 612). Smart antenna or telematics control unit (TCU) 612 may communicate with an Ethernet gateway 630, which in turn may communicate with other devices, such as steering wheel actuator ECU 620, in-car entertainment (IVI) headunit 640 (which is in turn provides communication via a USB port to a USB media module 642), ADAS front camera 650 (e.g., for adaptive cruise control, collision avoidance systems, forward collision warning, etc.), ADAS rear camera 660, vehicle body CAN gateway 670 (which in turn is in communication with body control ECU 680 and engine control ECU 690). Though broker is not illustrated in FIG. 6, broker may be present in various blocks illustrated.

Figure 7A:
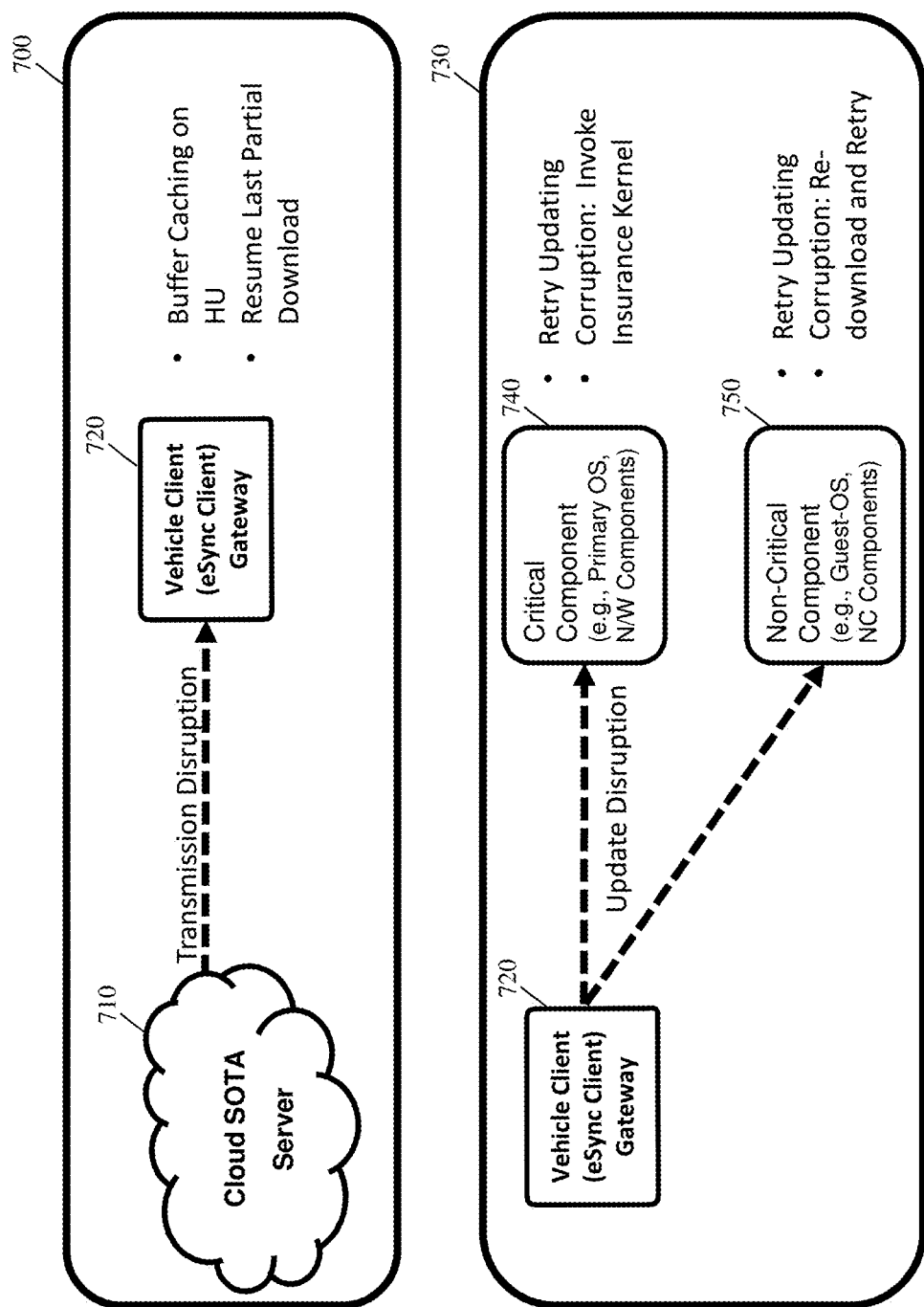
FIG. 7A is a block diagram illustrating disruption recovery procedures from the server to the vehicle and within devices in the vehicle.

FIG. 7A is a block diagram illustrating recovery procedures responsive to disruptions from the server to the vehicle and within devices in the vehicle. Specifically, block diagram 700 illustrates transmission disruptions (e.g., a connection failure) between the Cloud Software Over The Air (SOTA) server 710 communicating with vehicle client gateway 720. The download may be cached in a buffer in a device within the vehicle, such as in a headunit. Further, responsive to a transmission disruption, the last partial download may be resumed.

Figure 7B:
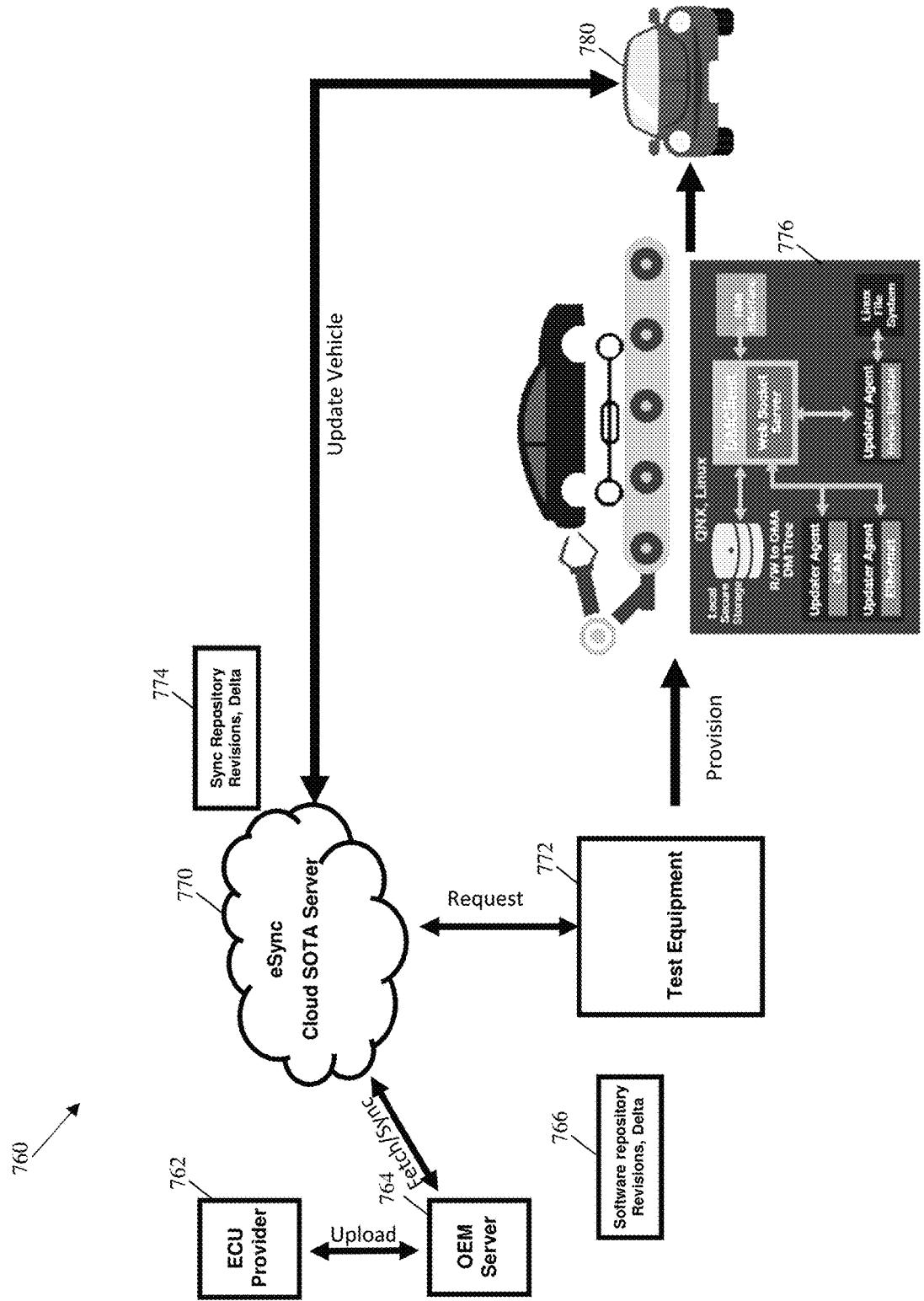
FIG. 7B is a block diagram illustrating Software Over-the-Air (SOTA) for manufacturing in bootstrap mode on assembly line.

FIG. 7A further illustrates transmission disruptions within the vehicle, such as between vehicle client gateway 720 and one or more components within the vehicle, such as critical component 730 and non-critical component. In the event of an update disruption between vehicle client gateway 720 and critical component 730, one or both of vehicle client gateway 720 and critical component 730 may retry performing the software update using the update agent, as discussed herein. In the event of corruption of the update, the critical component 730 may be rolled back to a previous software version using insurance kernel 430. In the event of an update disruption between vehicle client gateway 720 and non-critical component 750, one or both of vehicle client gateway 720 and non-critical component 750 may retry performing the software update using the update agent. In the event of corruption of the update, the software update may be downloaded again; after which, the update agent may attempt to perform the installation of the software update. In this regard, the configuration enables a highly fault tolerant and fail-safe system FIG. 7B is a block diagram 760 illustrating Software Over-the-Air (SOTA) for manufacturing in bootstrap mode. The bootstrap mode may comprise the process of initiating the first programming of the devices in a vehicle while the vehicle moves along an assembly line. The OEM server 764 may communicate with ECU provider(s) 762 in order to obtain the upload software, dependencies, revisions etc. for the specific model of the vehicle (e.g., the update software for upload to the vehicle). Further, the OEM server 764 may save the upload to a memory, such as software repository revisions, delta 766, which may store the various revisions of software that may be resident in the vehicle, including the software subject to upload and previous versions of the software, and the deltas for transmission to the vehicle. The OEM server 764 may communicate with eSync Cloud SOTA Server 770, which may itself communicate with a memory, such as software repository revisions, delta 774, which may likewise store the various revisions of software that may be resident in the vehicle, including the software subject to upload and previous versions of the software, and the deltas for transmission to the vehicle 780. Further, test equipment 772 may be used to mimic the same communication protocols used to program vehicles from the Cloud SOTA server. These protocols may include DOIP, SOME/IP, DOCAN, UDS, etc. The interface from the cloud to the vehicle ECUs may be simulated or implemented using test equipment just as well. In particular, test equipment may comprise the primary method for flashing the ECUs in the assembly line in absence of a cloud server arrangement.

Figure 8:
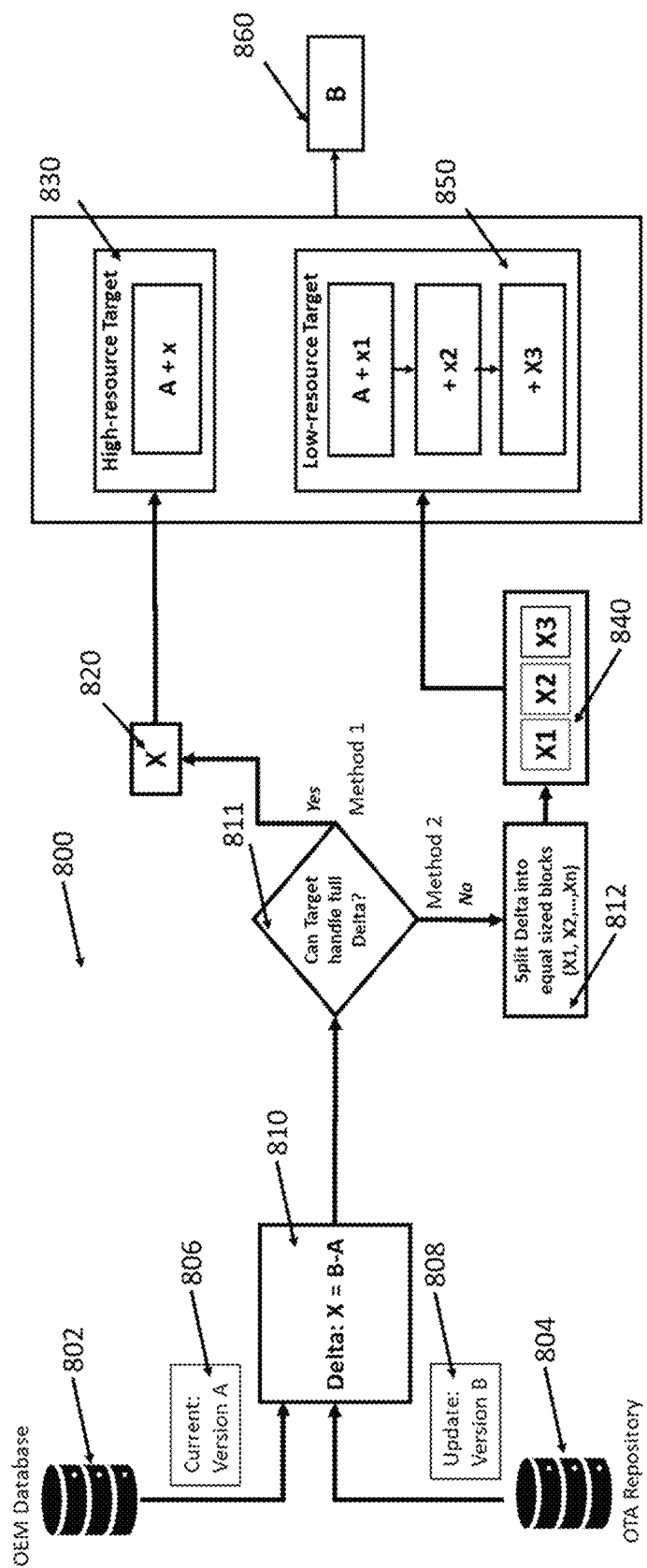
FIG. 8 is a flow diagram of an approach for a delta update process for Software revision updates in a vehicle.

FIG. 8 is a flow diagram 800 of a conventional approach for a delta update in a vehicle. The OEM database 802 generates an update 806, which, using the OTA update history 804 and the current software version 808, generates the delta at 810. The size of the delta update may determine the selection of which approach, from at least two approaches, to use in order to implement the software update. For example, two approaches may be used, including Method 1, which uses a single update transfer X 820, in order to generate the update in Target 830 to create B 860, or Method 2, which uses multiple sections transfers 840 of X1, X2, X3, in order to generate the update in Constrained Target 850 to create B. For example, Target 830 has the capability, such as the memory capability and/or the processing capability, to perform the update using the single update transfer X 820. This may occur, for example, when Target 830 includes multiple banks of memory, as discussed above. As another example, Constrained Target 850 is incapable, such as lacking the processing and/or memory capability, to process the single update transfer X 820. In this regard, Method 2 is used in order to divide the update into multiple integral units in 812 to create 840 comprising of X1, X2, X3. Though FIG. 8 shows three divisions, the division of the can be n number of blocks (e.g., Xn). This may occur, for example, when Constrained Target 850 performs in-place replacement. In this regard, depending on whether the target device is constrained, such as based on memory capabilities, the delta update may be divided into multiple parts.

Figure 9:
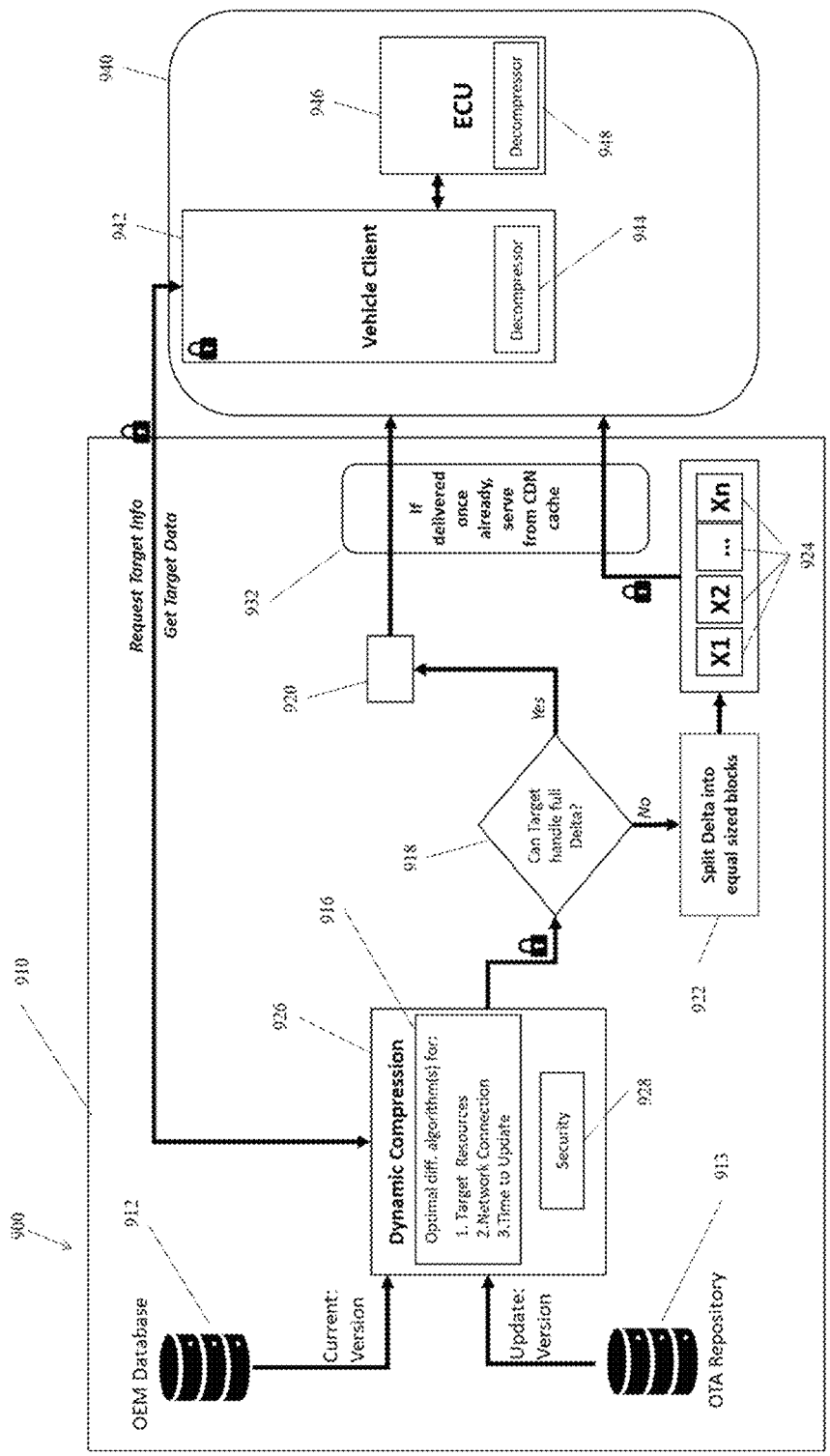
FIG. 9 is a flow diagram of an adaptive delta update process in the delta generator server and the in-vehicle client.

FIG. 9 is a flow diagram 900 of an adaptive delta update in a vehicle. Delta generator server 910 includes dynamic compression 926 which takes inputs from server database data 912 (which may be indicative of the current version of the software), and the repository database data 913 (which may be indicative of the new or updated version of the software) for comparison to generate delta output. The output from server database 912 or repository database 913 may comprise any one, any combination, or all of: the software update (e.g., the Update Image); Content; and Data Type. Optimal differential algorithm 916 uses one or more factors in order to determine the optimal differential algorithm for the software update. For example, optimal differential algorithm 916 may use any one, any combination, or all of the following: the target device resources (e.g., memory, computational, security); network connection (e.g., a specific network connection as dictated by the OEM); time to update; or security.

As discussed above, the delta generator server 910 may receive information regarding the capability of the target device (e.g., ECU 946). That information may be in one of several forms. One form comprises a string value. The string value may conform to a particular syntax. For example, the value may comprise a list of properties and their values, with some of the properties consisting of a single value and other properties comprising multiple values. Different properties may be separated by semicolons (;). Multiple values may be separated by commas (,). Properties may be separated from values with colons (:). In cases where special characters are used as part of the property name and/or value, the special characters may be escaped by being prefixed with a backslash (/) character. Therefore, any backslash characters are also escaped in the same manner.

The information regarding the capability of the target device may be communicated in one of several ways. In one way, OID coding may be used, with one implementation of converting each character of an OID into a half byte as follows:

| | | |
|---|---|---|
| 0 | 0000 | 0 |
| 1 | 0001 | 1 |
| 2 | 0010 | 2 |
| 3 | 0011 | 3 |
| 4 | 0100 | 4 |
| 5 | 0101 | 5 |
| 6 | 0110 | 6 |
| 7 | 0111 | 7 |
| 8 | 1000 | 8 |
| 9 | 1001 | 9 |
| | 1010 | a |
| padding | 1011 | b |

If the amount of half bytes is not even, then padding may be added at the beginning. If all half bytes (now guaranteed to be even) are arranged from left to write, they are then translated into a byte stream. The bytes are then encoded, such as by using Base64 and exclamation mark character (!) is prepended to the Base64 value. For example, OID 1.2.250.1.104. Translate into half bytes: 0001 1010 0010 1010 0010 0101 0000 1010 0001 1010 0001 0000 0100. The number is uneven, so add padding: 1011 0001 1010 0010 1010 0010 0101 0000 1010 0001 1010 0001 0000 0100. Covert to bytes: 10110001 10100010 10100010 01010000 10100001 10100001 00000100.

Hex representation: B1 A2 A2 50 A1 A1 04

Base64: saKiUKGhBA==

Base64 without padding: saKiUKGhBA

Capability value: !saKiUKGhBA

With regard to a value comparison, since the capability value of the target device may be represented as set of key/value pairs, and individual value may be a set of values, the process that translates the capability string into some internal value and back may produce a different string result than the original since the order does not necessarily matter. Further, since the server uses the capability value as a key into database of produced diff binaries, the value is encoded deterministically. For this purpose, any time the capability value is encoded as string, the following rules are observed: (1) any property must only be encountered once (if the property was present multiple times, the values are collapsed into a multiple value); (2) properties are listed in lexicographical order; (3) multiple values are listed in lexicographical order; and (4) duplicate values for the same property are eliminated. In this way, the delta generator server 910 may receive the various capabilities of the target device.

In one implementation, the delta generator server 910 may review the list of supported delta algorithms and/or the list of supported compression algorithms sent by the target device. In one example, the target device may indicate that delta algorithm "A" and compression algorithm "Z" are supported. In a first specific implementation, the delta generator server 910 selects delta algorithm "A" and compression algorithm "Z", as specified by the target device. In a second specific implementation, the delta generator server 910 selects a new delta algorithm and/or new compression algorithm (not currently supported by the target device) than what was specified by the target device. Specifically, in response to the delta generator server 910 determining that the memory in the target device (e.g., as indicated by the target device) is capable of storing the delta update and the new delta algorithm and/or new compression algorithm, the delta generator server 910 may send the new delta algorithm and/or new compression algorithm. In one implementation, the delta generator server 910 may review the list of supported delta algorithms and/or the list of supported compression algorithms sent by the target device, analyze the list(s) and determine to send a new delta algorithm and/or new compression algorithm. This determination may be based on a comparison of the current delta algorithm(s) and/or current compression algorithm(s) in the target device versus the new delta algorithm and/or new compression algorithm, and may be based on an amount of memory available in the target device.

In another example, the target device may indicate that delta algorithms "A" and "B", and compression algorithms "Y" and "Z" are supported. In a first specific implementation, the delta generator server 910 selects one of delta algorithm "A" or "B" and compression algorithm "Y" or "Z" based on the capability of the target device. In one implementation, the delta generator server 910 may select delta algorithm "A" or "B" based on the capabilities of the target device (e.g., the memory capabilities and/or the computational capabilities of the target device) and/or the bandwidth capabilities of the target device and/or the selected network connection. In a second specific implementation, the delta generator server 910 selects a new delta algorithm and/or new compression algorithm (not currently supported by the target device) than what was specified by the target device. Specifically, in response to the delta generator server 910 determining that the memory in the target device (as indicated by the target device) is capable of storing the delta update and the new delta algorithm and/or new compression algorithm, the delta generator server 910 may send the new delta algorithm and/or new compression algorithm.

Further, the delta generator server 910 may determine a number of integral divisions of the delta. For example, responsive to the delta generator server 910 determining that the available memory in the target device (e.g., the scratch memory used to implement the update) is very small (e.g., less than a predetermined amount), the delta generator server 910 may divide the delta update into a number of integral sections, with each of the integral sections being less than the available memory in the target device.

In particular, responsive to the delta generator server 910 determining that the delta requires more memory than the amount of memory as indicated in property "C" (discussed above), the delta generator server 910 may divide the delta into divisions (such as into two integral divisions as in 924-X1, X2), three integral divisions, etc. as shown in 924-X1, X2, X3 etc.), with each of the divisions being no more than the memory as indicated in property "C" (and being integral so that the partial update may be performed for the respective division). In practice, the target device (e.g., ECU 946) may perform the software upgrade on a first division (decrypt the first division, decompress the first division, integrate the decompressed/decrypted first division into flash), and responsive to the target device integrating the first division into flash, the target device requests from the delta generator server 910 the next division (thereby iterating until all of the divisions are integrated into the flash on the target device). By way of example, in response to the delta generator server 910 determining that the available scratch memory is 100 Kb and the delta update is 350 Kb, the delta generator server 910 may segment the delta update into 4 integral divisions (e.g., each division is integral and can be integrated into the target device).

Thus, the optimal delta for a target device (e.g., a target ECU) may depend on a variety of factors, such as the available resources on the target device: memory (e.g., amount of memory available for decompressing the delta and more importantly, reconstructing the image); computational (which may affect the time needed to reconstruct the image); or security (which may affect the ability to decrypt the encrypted delta). If the target device has no support for security (e.g., the target device does not have an AES decryptor or does not have sufficient memory/computational capability to perform the decryption), the decryption may be performed at the closest node in the chain which has sufficient resources to decrypt (e.g., possess an AES decryptor or has sufficient memory/computational capability to perform the decryption).

Optimal differential algorithm 916 may further determine whether there are any OEM specified requirements or custom algorithms in performing the software update. For example, the OEM may require a specific network type connection preference in order to deliver the updates.

Thus, one factor in the analysis is whether the target device has the ability to decrypt and decompress the software update and whether the target device has the ability to reconstruct the full image of the update. If the delivered software update cannot be handled by the target device, and decryption and/or decompression must be performed by another device, such as the head unit, security, when transferred the decrypted/decompressed software update to the target device (e.g., from the head unit to the target device) may become an issue.

As shown in FIG. 9, dynamic compression includes security 928, which may perform encryption on the delta update(s). For example, the compressed difference files may then be encrypted using security levels and cryptographic protocols. The level and the protocols may be based on any one, any combination or all of: the in-vehicle network topology for that vehicle (e.g., based on vehicle's make/model/year combination); security infrastructure in the vehicle (e.g., availability of a Trusted Platform Module (TPM) or hardware security module (HSM) for secure key storage; the sub-network the ECU is on and/or the network's ability to handle encryption levels); the capability of the target device itself (e.g., if the ECU is not fully capable, the nearest "hop" in the chain which is capable of decrypting the payload); or other factors.

The results of security 928 may be placed in cache 932, which may be resident in delta generator server 910 or may be resident elsewhere, such as in a Content Delivery Network (CDN). Thus, responsive to receiving a request for an update from vehicle 940, the delta generator server 910 may determine whether to access cache at 932 (if the encrypted delta update(s) are resident in cache) or go to 920 or 924 if the encrypted delta update(s) are not resident in cache.

In addition, transferring the current revision of the software from the target device to the head unit and the full image from the head unit to the target device may put additional bandwidth loads for the in-vehicle network. This, in turn, may weaken robustness of the OTA system in the event that an update retry is necessary or the update fails at the target device.

At 918, delta generator server 910 determines whether the target device can handle the full delta. For example, delta generator server 910 may determine that the delta update is for a certain target device (e.g., ECU 946). As discussed in further details below, in order to implement the delta update, the target device performs certain functions, such as any one, any combination, or all of: decryption; decompression; reconstruction of the image; and flashing to non-volatile memory. Thus, the delta generator server 910 may determine the capabilities of the certain target device (e.g., the memory resources, the computational resources, etc.) in order to determine whether the certain target device has sufficient capabilities to perform any one, any combination, or all of the functions to implement the delta update.

In the event that the delta generator server 910 determines that the certain target device has sufficient capabilities to perform any one, any combination, or all of the functions to implement the delta update, the delta generator server 910 selects a unitary piece 920 for the entirety of the delta update. In the event that the delta generator server 910 determines that the certain target device has insufficient capabilities to perform any one, any combination, or all of the functions to implement the delta update, the delta generator server 910 may split the delta update into sections 922 so that the delta update is in multiple sections 924 (X1, X2, . . . Xn). The splitting of the delta update into sections 924 may be dynamically performed between the current version in 912 and the new version in 913, or may be performed previously and accessed from server database 912. Further, the number of sections for the split may be pre-determined or may be dynamically selected. For example, responsive to the delta generator server 910 determining that the certain target device's resources (e.g., memory and/or computational resources) are insufficient to perform the delta update in a unitary piece 920, the delta generator server 910 may select a predetermined number of sections. Alternatively, the responsive to the delta generator server 910 determining that the certain target device's resources (e.g., memory and/or computational resources) are insufficient to perform the delta update in a unitary piece 920, the delta generator server 910 may dynamically select the number of sections 924 based on the certain target device's resources. For example, responsive to determining that the certain target device has greater than 500 Kb but less than 1 Mb of RAM, the delta generator server 910 may select sections of the delta update that are no less than 500 Kb but less than 1 Mb. As another example, responsive to determining that the certain target device has greater than 250 Kb but less than 500 Kb of RAM, the delta generator server 910 may select sections of the delta update that are no less than 250 Kb but less than 500 Kb.

Based on the analysis of optimal differential algorithm 916 and the number of sections for the delta update, the delta update(s) are dynamically compressed at 926. For example, dynamic compression 926 may determine, based on input from 916 and predetermined 920 or 924 split, the compression to use. In particular, dynamic compression 926 may have a plurality of compression algorithms from which to select in order to compress delta update(s) 920/924. In one implementation, dynamic compression 926 may access one of a plurality of binary differencing algorithms to compress delta update(s) 920/924. Different binary differencing algorithms may exhibit different efficiencies for different data content. Further, different binary differencing algorithms may have different computational requirements to generate the most efficient difference files. Thus, in one implementation, dynamic compression 926 may select the specific binary differencing algorithm based on the computational resources of the target device and/or the number of sections of the delta update 924.

In one implementation, the configuration of the delta update is agnostic on the actual update image format. Typical image formats may comprise ECU binaries arm 32/64 bit, Head Unit binaries, Android, Linux and QNX operating system files and drivers, application packages, navigation map files, XML files etc. Thus, dynamic compression 926 may apply different algorithms for different image formats in order to obtain optimal difference files.

In one implementation, one or more encrypted delta update(s) are sent to vehicle 940. For example, the delta generator server 910 may send both forward and reverse deltas to the ECU 946 in the vehicle 940. The current version of the software may be designated as "A", and the updated version may be designated as "B". Two deltas, including a forward delta (which may comprise B-A) and a reverse delta (which may comprise A-B) are sent. If there is no redundant space in the target device, such as ECU 946, the eSync Client Module may update A to B in-place (so that A is no longer available). If there is a failure (e.g., B does not work), then the eSync Client Module may update B back to A (using reverse delta) since the A version of the software previously worked. If for some reason this delta reconstruction fails, then the eSync Client Module may request the full A (e.g., the previous version of the software) to rollback and update.

In one implementation, the vehicle 940 receives the delta update(s) responsive to a request from the vehicle 940 for the software updates. The request from the vehicle may include the current state of the software resident in the target device (e.g., the Current Image Details), the resources of the target device (e.g., memory, computation, security resources), and/or the Network Connectivity as dictated by the target device).

Alternatively, the vehicle 940 receives the delta update(s) without prompting from the vehicle 940 for the software updates. For example, the delta generator server 910 may receive input from an OEM server, such as OEM server 160, in order to prompt the delta generator server 910 to send the delta update(s). A vehicle client 942 may receive the delta update(s). As discussed further below, the vehicle client 942 may comprise a Download Manager Client Module (eSync Client Module). The vehicle client 942 may then decompress the software update(s) using decompressor 944. After which, the decompressed software update(s) may be transmitted to the target device (e.g., ECU 946). Alternatively, the target device may perform the decompression (such as using decompressor 948 resident in ECU 946).

Various functions may be performed in order to implement the delta update in the target device. For example, one or more functions may be performed to prepare the delta update(s) prior to saving to non-volatile memory (e.g., flash memory). In particular, one, some or all of the following may be performed to prepare the delta update(s): decryption; decompression; and reconstruction of image. After which, the prepared delta update(s) may be saved to non-volatile memory (e.g., performing a flash update for storage of the update to flash memory).

As discussed above, the delta generator, such as delta generator server 910, may include a delta compressor, delta encoder, or the like. Further, as discussed above, the delta generator may receive one or more criteria of the client device. One example criterium is the memory management of the client device for the software upgrade. In particular, the memory management may include: (1) copy-and-replace; (2) secondary boot loader being present; or (3) in-place replacement. For example, with regard to copy-and-replace, the update process may use separate banks of memory, such as two banks in the memory, with a first bank to store the existing code and a second bank to store the update. After storing the entire update in the second bank, the client device may switch access from execution of the code stored in the first bank to the second bank. With regard to in-place replacement, the memory assigned to store the existing code is at least partly rewritten with the software update during the software update process).

Responsive to delta generator receiving the criterium as to the memory configuration of the client device, the delta compressor/encoder may determine how it derives the difference file to be sent to the vehicle, as discussed further below.

In one implementation, for each defined memory sector created (such as for every difference flash sector created), reference attributes (such as the delta reconstruction patch) may be created. In one implementation, the delta reconstruction patch format may comprise a sequence of records, such as any one, any combination, or all of the following as described below:

<copypos, copylen, extralen, copydiffbytes, extrabytes>
whereby:

copypos is the offset in the reference image to copy from.

copylen is the number of bytes to copy from the reference image

Copydiffbytes is the number of copydiffbytes, which may comprise the number of diff bytes sitting in the Delta reconstruction buffer 1010 for copying to the temporary buffer 1020 for delta reconstruction.

extralen is the number of bytes of extrabytes, which may be indicative of the number of bytes by which the updated section will grow in the event the update is not in-place replacement.

The above is merely one example; other variables are contemplated. Thus, in one implementation, the practice whereby an image is reconstructed comprises walking through these records:

1) copy from ref to a section of memory (such as to a certain bank of memory, buffer RAM, flash, etc.), bytewise arithmetic;

2) add the diff bytes to the just copied bytes, advance the destination pointer by copylen; and 3) copy the extra bytes, advance the destination pointer by extralen.

As discussed above, the delta generator may generate a difference between the existing software and the software upgrade. Thus, in one implementation, the delta compressor/encoder may identify a match for a given sector, record it, and then creates a difference. As mentioned above, the sector from which the initial reference copy is made is identified as the copypos. For example, if the existing software is stored in 5 sectors (sector 1, sector 2, sector 3, sector 4, and sector 5), the record copypos may identify the offset for the sector to use as the initial reference copy. Further, the number of bytes copied is copylen. The delta compressor/encoder may create the reference block in the buffer memory similar to what would be used in the decoder (e.g., in the client device subject to software upgrade). In one implementation, in-place replacement reduces the sectors (or sections) from which to generate the delta from. For example, in-place replacement results in replacement of sector 1 with the upgraded code. After the upgraded code is saved to sector 1, sector 1 is thereafter deemed unusable from which to generate the delta from (e.g., in the 5 sector example given above, after the software upgrade is saved to sector 1, only sectors 2-5 are thereafter available from which to generate the delta). In this way, the delta compressor/encoder does not refer to the replaced position for its match segment. Further, the boundary, indicating the point (such as the starting point) in memory where the delta compressor/encoder may use for matched segments is moved as the software code is refreshed into the memory (e.g., after the software upgrade is saved to sector 1, the boundary is moved to indicate that the range now begins at sector 2).

In one implementation, non-volatile memory may be used as the reference data (e.g., from which the delta may be generated). For example, in a flash memory based system, to reduce system RAM buffer size, the flash memory itself may be used to store the reference data. Thus, in practice, the flash memory may be erased and rewritten, sector by sector, as the decode progresses.

In one implementation, the delta compression/encoder may account for latency between the flash rewrite and the delta reconstruction of the new sector in order to avail of the greater part of the reference memory for creating records. In particular, the latency may be indicative of the number of sectors in the temp buffer. For example, if the temp buffer has space for four sectors, then until four records are created, the delta compression/encoder may continue to have full access to reference memory until four sectors are created. After the four sectors are created, then the first sector is copied back to the reference memory (so that the first sector becomes unavailable as potential reference memory), and the reference memory pointer may be updated (e.g., pointing to sector two) as the re-written sector is no longer available for reference. In a specific example, if there are 8 sectors in the buffer memory, then the write may be performed after the 8 sectors diffs have been created by the delta compression/encoder. In contrast, if there were only one sector buffer memory, then the default action as explained above follows.

One or more variables may be used to indicate the latency. For example, variables such as sectorsize and sectordelay (one or both of which may indicate sector latency), thus giving an indication of how far behind from the decode, the erase will occur.

In one implementation, the delta compressor/encoder is told of the sectorsize and sectordelay so the delta compressor/encoder may ensure that copy blocks for the current decode position do not refer to sectors that have been erased (and have been rewritten with updated code).

In one implementation, ff sectordelay=0, then the delta compressor/encoder may assume that the reference image is not overwritten until the entire new image has been reconstructed (e.g., the client device may have multiple banks of memory).

As discussed above, a power failure (or other interruption event) may occur during the software upgrade. To account for this possibility, a mirror creation of one, some, or all of the reference blocks may be stored to flash memory. For example, if there are four sectors in the temp buffer memory, then an equivalent image (e.g., four sectors) may also be allocated in the flash memory for storage thereto. The pointers may also be preserved. Thus, in one implementation, responsive to a new sector being created (e.g., every time a new sector is created), the data saved to the new sector is automatically written to the flash memory. In this way, the sector creation process may be made power fail safe so that, upon restart, the process may proceed from where it was at the occurrence of the power failure. Thus, since the client device in one implementation always rewrites it into the reference memory, the written records are safe for use upon restart, and only the ones in the temporary buffer (e.g., whether stored in static or dynamic RAM) lose their contents if power fails.

As discussed above, in one implementation, reference memory contains the original code stack that needs to be updated piecewise. After each piecewise update of the reference memory area, that updated area may no longer be used as a reference memory area. Further, the write pointer for the remaining reference memory may be updated to indicate the new start address for the reference memory that is left to be updated.

FIG. 10 is a flow diagram of an example of an expanded adaptive delta update process in the vehicle, which is received from server into delta reconstruction buffer 1010. At 1040, the delta update code is copied into temporary buffer 1020. At 1050, the reference code may be copied into temporary buffer 1020. The reference code may be accessed from the write memory start address.

The delta update may be added to the reference code in temporary buffer 1020. The client device may generate the updated source code from the delta update code and the reference code, and at 1060, the updated source code may be copied back into the reference memory at the write memory start address.

After writing the updated source code back into the reference memory (as indicated at Flash Mem Write Ptr, the write pointer may be updated in the reference memory to mark the boundary of the new reference code memory area. Thus, the code below the write pointer now has the updated code and is no longer used for the reference memory code area.

The following is an example of pseudo code for a reconstruction algorithm. In particular, the following is the initial scheme for resume reconstruction:
   check ref secure hash algorithm (SHA) as usual
   If ref SHA fails, then check resume record (saved into volatile memory)
   The resume record may contain the following:
     number sectors completed
   Initialize resume as follows:
     Copy sector backup buffers into sector RAM buffers
     Walk through delta file from beginning until reach end of num sectors completed
     Continue normal reconstruction The following is the pseudo code for normal reconstruction:
   reconstruct into sector RAM buffer
   when buffer complete:
     1 erase sector backup buffer
     2 write sector ram buffer into sector backup buffer
     3 erase target sector
     4 write target sector
     5 update numsectors complete in resume record The process fails if power loss occurs after step 1, thereby necessitating an extra backup buffer.

For example purposes, there are 4 sector ram buffers b0 . . . 3. Thus, there are also 4 sector backup buffers B0 . . . 3 and 1 (e.g., in flash memory) extra backup buffer Bx in the event of an unexpected power loss.

b—sector ram buffer
B—sector flash backup buffer
R—flash reference image sectors
Using the following nomenclature:
R1+d5->b0—means reconstruct sector 5 into b0
   R1+ is reference sector 1 and above
Normal reconstruction comprises the following sequence:
R0+d0->b0
R0+d1->b1
R0+d2->b2
R0+d3->b3
   b0->R0; because the RAM buffers b0 . . . 3 are full, b0 is written to R0, reference sector 0
R1+d4->b0; because b0 was written to R0 (sector 0), the reference sector changes from sector 0 and above to sector 1 and above (as indicated by R1)
   b1->R1
R2+d5->b1
   b2->R2
R3+d6->b2
   b3->R3
R4+d7->b3
   b0->R4
R5+d8->b0
   b3->R5
R6+d9->b1
   b3->R6
R7+d10->b2
   b3->R7
R8+d11->b3
   b0->R8
R9+d12->b0
   b1->R9

The resume case is more complicated than the normal reconstruction case. Specifically, one may analyze for power loss at each step. For example, for resume, one may add B0 . . . 3, Bx and a state Nx, where N is Reference sectors lost, and State=0 indicates that the entire Reference image is available. Further, x is present if Bx is used.

. . .
R0+d3->b3
   erase Bx
   b3->Bx
   state=1x; R0 is about to be erased, Bx is used
   erase B3
   b3->B3
   state=1; R0 is about to be erased, Bx is not needed
   erase R0
   b0->R0
R1+d4->b0
   erase Bx
   b0->Bx
   state=2x; R1 is about to be erased, Bx is used
   erase B0
   b0->B0
   state=2; R1 is about to be erased, Bx is not needed
   erase R1
   b1->R1
R2+d5->b1
   erase Bx
   b1->Bx
   state=3x; R2 is about to be erased, Bx is used
   erase B1
   b1->B1
   state=3; R2 is about to be erased, Bx is not needed
   erase R2
   b2->R2

R3+d6->b2
  erase Bx
  b2->Bx
  state=4x; R3 is about to be erased, Bx is used
  erase B2
  b2->B2
  state=4; R3 is about to be erased, Bx is not needed
  erase R3
  b3->R3
  R4+d7->b3

The following is an example of a reconstruction with resume:

Thus, there may be two types of copying from non-volatile memory into volatile memory (e.g., flash memory to RAM memory) including: (1) copying from the code section in flash of the previous version of the code from flash into RAM for use with the delta update; and (2) copying from a scratch section of flash used as a backup for RAM in the event power is interrupted. Thus, when reconstructing, the scratch section of the flash memory at the endpoint device may be used as the backup to the volatile buffer. Thus, B0 . . . B3 may store content from b0 . . . b3. Thus, when Reference SHA fails, the system may obtain the resume state. For example, given a resume state of 4x (see above where state=4x; R3 is about to be erased, Bx is used):

B0 . . . B3->b0 . . . b3; loading the backup from the flash into the volatile buffer
  Bx->b2
  erase B2
  b2->B2
  state=4
  erase R3
  b3->R3
  R4+d7->b3

As another example, given a resume state of 4:
  B0 . . . B3->b0 . . . b3
  erase B2
  b2->B2
  state=4
  erase R3
  b3->R3
  R4+d7->b3

As discussed above, there are certain instances where the memory resident in the client device can handle the entire delta. In other instances, the memory resident in the client device is unable to handle the entire delta, resulting in the delta being divided into different divisions. In one implementation, the delta is broken up into "integral" divisions, whereby each "integral" division is a complete unit in and of themselves.

In the instance where the update is in middle of a unit and communication fails, when communication resumes, one may start with an address packet for the respective unit starting at the beginning of the respective unit. For example, in the event that communication fails with the 7$^{th}$ integral unit, upon resuming, the system may return to zero for the 7$^{th}$ unit (the beginning of the 7$^{th}$ unit).

Further, as discussed above, the delta generate server may be presented with one or more constraints that faces, such as any one, any combination, or all of: performance; memory size; or bandwidth. Responsive to the constraints, the delta generator server may determine the best compression scheme.

In practice, one may overwrite a single sector (including with added bytes). In this regard, what is written may not be able to be searched. However, with buffer space, one may delay the refresh. In particular, one may re-create the code in the buffer space, such as responsive to receiving the delta and using the delta and a section of the original code, re-creating the update in the buffer space. This procedure may be performed until the buffer space is entirely filled. Thus, by using the buffer space, the server may have the entire memory range from which to search from longer than without using the buffer space. In one implementation, the encoder on the delta generator server may receive an indication of the buffer space, such as by receiving one or more inputs (e.g., "weighting factors"). Responsive to the inputs, the encoder may determine the differential data to send to the client device.

Thus, on the server side, the delta generator server may create the delta, such as by: (a) computing the differences between the current and the desired version (e.g., performing data differencing or binary differencing); (b) compressing the difference (e.g., generating the delta update); and (c) encrypting the delta. With regard to transmission, the delta generator server may send the secured delta using the fastest or a specified network connection.

On the vehicle side, the client device resident in the vehicle may create the update image by: (a) decrypting the encrypted delta; (b) decompressing the compressed delta; (c); adding the delta to the existing version to get the new version; and (d) store the new version to non-volatile memory (e.g., to flash).

Thus, in one implementation, the delta generator server generates the delta in order for the target client device (or a device within the vehicle separate from the target client device) to perform the various functions of the software upgrade. As one example, the target client device may have the capability to perform all of the following functions: decryption of the update; decompression of the update; and reconstruction of the full image of the update. As another example, the target client device may be unable to perform one or more of decryption, decompression, or reconstruction. Responsive to determining (such as by the delta generator server) that the target client device is unable to perform one or more functions (such as being unable to perform decryption and/or decompression), the delta generator server may command another device within the vehicle, such as the head unit, to perform these functions.

In one instance, the target client device cannot perform any of decryption, decompression, or reconstruction. Thus, in this instance, another device, such as the head unit may perform each of these functions. However, the target client device transferring the current revision of the software to the head unit and also the head unit transmitting the full image to the target client device puts additional bandwidth loads for the in-vehicle network. This is further exacerbated if an update retry is necessary or the update fails at the target device. In another instance, the target client device can perform reconstruction but not decryption or decompression; the delta generator server may command the head unit to perform decryption and decompression to transmit the decrypted uncompressed update to the target client device for reconstruction). Again, the head unit transmitting the full image to the target client device puts additional bandwidth loads for the in-vehicle network. In still another instance, the target client device can perform decompression and reconstruction but not decryption; the delta generator server commands the head unit to perform decryption and to transmit the decrypted compressed update to the target client device for decompression and reconstruction).

Because the software update is being transmitted within the vehicle unencrypted, one or more electronic devices in the vehicle may modify its operation response to this.

Figure 11:
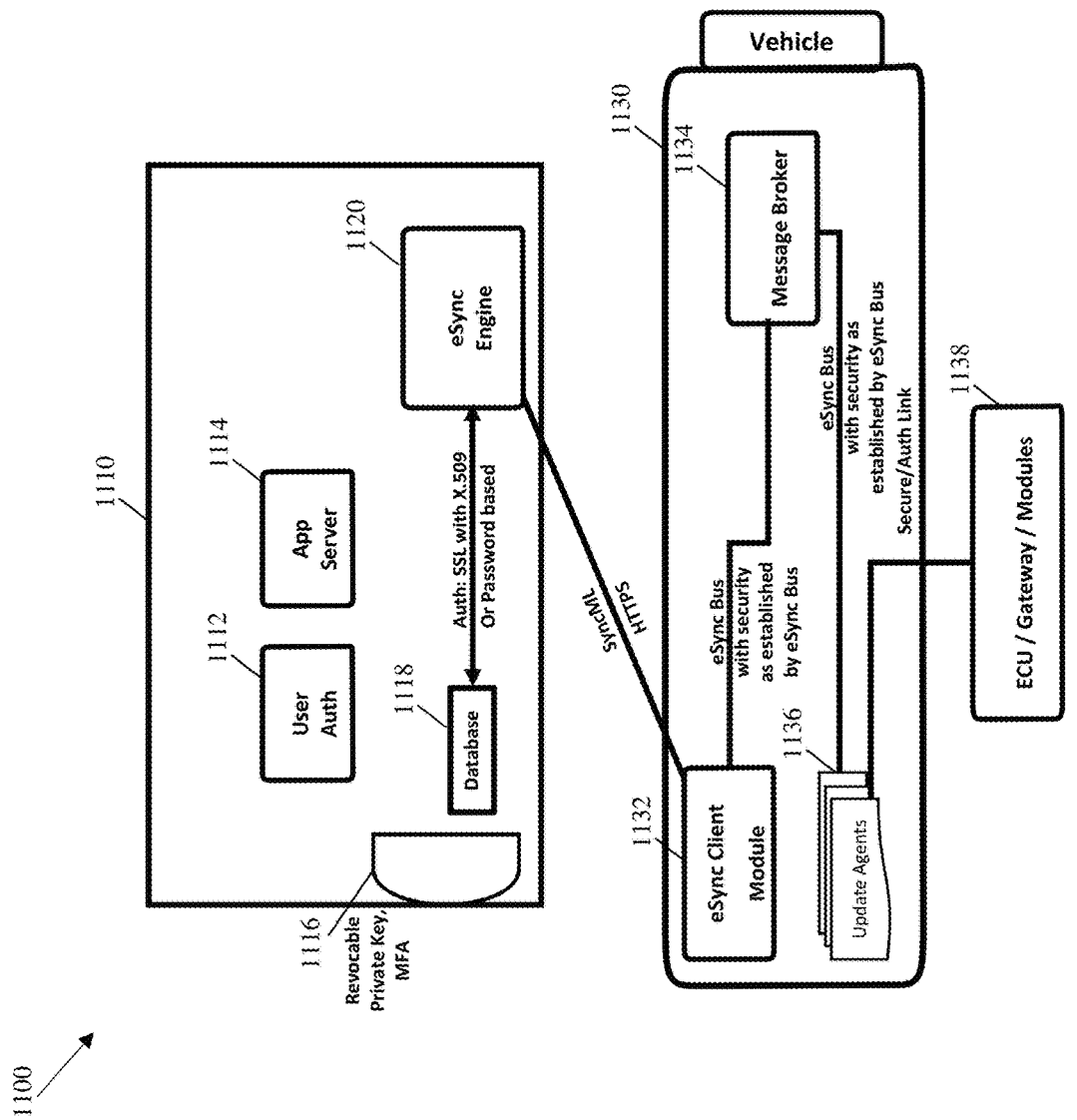
FIG. 11 is a block diagram of security architecture from the server in the cloud to in-vehicle client.

FIG. 11 is a block diagram 1100 of security from the cloud to within the vehicle. Server 1110 may include user authorization 1112, app server 1114, revocable private key, multi-factor authentication (MFA), database 1118, and eSync engine 1120. Vehicle 1130 includes eSync Client Module 1132, message broker 1134 (an example of broker 120), and one or more update agents 1136. In practice, eSync Client Module 1132 communicates with eSync engine 1120, such as via Hyper Text Transfer Protocol Secure (HTTPS) or SyncML (Synchronization Markup Language). Further, eSync Client Module 1132 communicates with message broker 1134 via one or more buses, such as via a proprietary bus protocol (e.g., such as disclosed in U.S. patent application Ser. No. 16/287,514 entitled "Broker-based bus protocol and multi-client architecture", filed on the same date as the present application, and incorporated by reference herein in its entirety) or via another type of bus (security may be as established by the eSync bus protocol, such as Transport Layer Security (TLS) 1.2, which may be established between message broker 1134 and eSync Client Module 1132, and message broker 1134 with any other device). In turn, message broker 1134 communicates with one or more update agents 1136, such as illustrated in FIG. 3, which in turn may communicate with other devices, such as an ECU, a gateway or other modules 1138.

Figure 12:
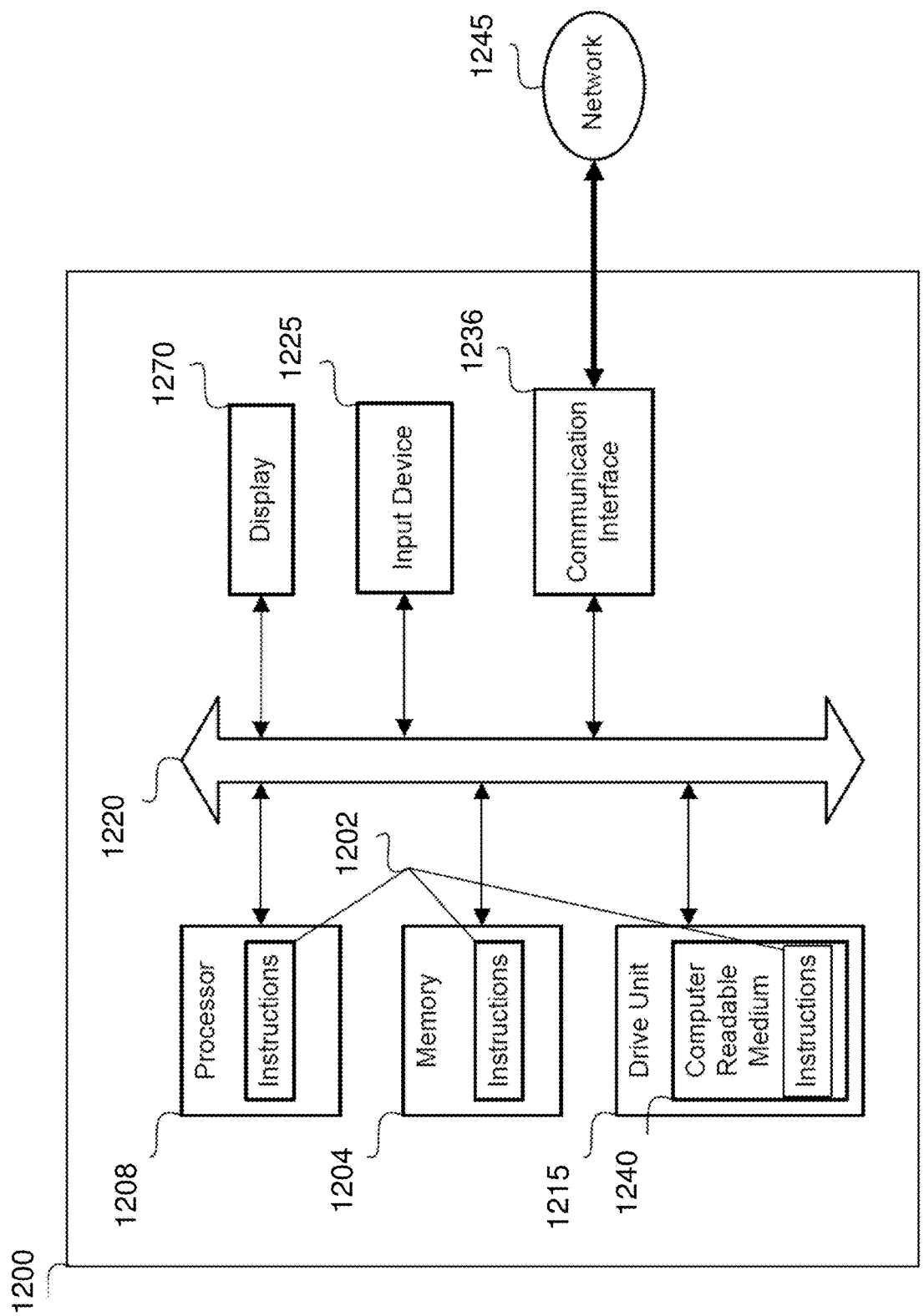
FIG. 12 is a general computer system, programmable to be a specific computer system, which may represent any of the computing devices referenced herein, such as the head unit or the smartphone.

FIG. 12 illustrates a general computer system 1200, programmable to be a specific computer system 1200, which can represent any server, electronic device or electronic component disclosed herein, such as any server, any vehicle client, any ECU, any gateway, any head unit, or the like. The computer system 1200 may include an ordered listing of a set of instructions 1202 that may be executed to cause the computer system 1200 to perform any one or more of the methods or computer-based functions disclosed herein. The computer system 1200 can operate as a stand-alone device or can be connected, e.g., using the network 1245, to other computer systems or peripheral devices.

In a networked deployment, the computer system 1200 can operate in the capacity of a server or as a client-user computer in a server-client user network environment, or as a peer computer system in a peer-to-peer (or distributed) network environment. The computer system 1200 can also be implemented as or incorporated into various devices, such as a personal computer or a mobile computing device capable of executing a set of instructions 1202 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 1200 can include a memory 1204 on a bus 1220 for communicating information. Code operable to cause the computer system to perform any of the acts or operations described herein can be stored in the memory 1204. The memory 1204 can be a random-access memory, read-only memory, programmable memory, hard disk drive or any other type of volatile or non-volatile memory or storage device.

The computer system 1200 can include a processor 1208, such as a central processing unit (CPU) and/or a graphics-processing unit (GPU). The processor 1208 can include one or more general processors, digital signal processors, application specific integrated circuits, field programmable gate arrays, digital circuits, optical circuits, analog circuits, combinations thereof, or other now known or later-developed devices for analyzing and processing data. The processor 1208 can implement the set of instructions 1202 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 1200 can also include a disk or optical drive unit 1215. The disk drive unit 1215 can include a computer-readable medium 1240 in which one or more sets of instructions 1202, e.g., software, can be embedded. Further, the instructions 1202 can perform one or more of the operations as described herein. The instructions 1202 can reside completely, or at least partially, within the memory 1204 or within the processor 1208 during execution by the computer system 1200. Accordingly, various databases, such as software repository revisions, delta 162, sync repository revisions, delta 172, local secure storage 412, flash memory 416, software repository revisions, delta 766, sync repository revisions, delta 774, server DB 912, etc., can be stored in the memory 1204 or the disk unit 1215.

The memory 1204 and the processor 1208 also can include computer-readable media as discussed above. A "computer-readable medium," "computer-readable storage medium," "machine readable medium," "propagated-signal medium," or "signal-bearing medium" can include any device that has, stores, communicates, propagates, or transports software for use by or in connection with an instruction executable system, apparatus, or device. The machine-readable medium can selectively be, but not limited to, an electronic, magnetic, optical, electromagnetic, infrared, or semiconductor system, apparatus, device, or propagation medium.

Additionally, the computer system 1200 can include an input device 1225, such as a keyboard or mouse, configured for a user to interact with any of the components of system 1200. It can further include a display 1270, such as a liquid crystal display (LCD), a cathode ray tube (CRT), or any other display suitable for conveying information. The display 1270 can act as an interface for the user to see the functioning of the processor 1208, or specifically as an interface with the software stored in the memory 1204 or the drive unit 1215.

The computer system 1200 can include a communication interface 1236 that enables communications via the communications network 1245. The network 1245 can include wired networks, wireless networks, or combinations thereof. The communication interface 1236 network can enable communications via any number of communication standards, such as 802.11, 802.17, 802.20, WiMax, 802.15.4, cellular telephone standards, or other communication standards, as discussed above. Simply because one of these standards is listed does not mean any one is preferred, as any number of these standards can never actually be adopted in a commercial product.

Block diagrams of different aspects of the system, including those illustrated herein including FIGS. 1-11, may be implemented using the computer functionality disclosed in FIG. 12. Further, the flow diagrams illustrated herein, including FIGS. 8-9, may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives can be considered a distribution medium that can be a tangible storage medium. The computer-readable medium is preferably a tangible storage medium. Accordingly, the disclosure can be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system can encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A server configured to transmit a software update to a vehicle or a premises, the server comprising:
   a communication interface configured to communicate with the vehicle; and
   a processor in communication with the communication interface, the processor configured to:
      receive an indication of one or more capabilities of target device resident in the vehicle and subject to the software update, wherein the one or more capabilities of the target device comprises a sector delay indicative of a size or number of sectors the target device compiles before the target device write the software update back into non-volatile memory;
      determine, based on the one or more capabilities of the target device, one or more of a delta algorithm, a compression algorithm or a number of sections of the software update in which to transmit;
      generate, based on the one or more of a delta algorithm, a compression algorithm or a number of sections of the software update in which to transmit, a delta between a current version of software resident in the target device and the software update; and
      send, based on the determined one or more of the delta algorithm, compression algorithm or number of sections, the delta to the vehicle in order to update the software of the target device.

2. The server of claim 1, wherein the processor is further configured to receive an indication of one or more capabilities of a bus resident in the vehicle through which the target device communicates; and
   wherein the one or more capabilities of the bus resident in the vehicle comprises an indication of a number of bits/second indicative of bandwidth of the bus to transfer the delta to the target device.

3. The server of claim 1, wherein the processor is further configured to receive an indication of one or more capabilities of a bus resident in the vehicle through which the target device communicates; and wherein the one or more capabilities of the bus resident in the vehicle comprises a clock speed of the bus.

4. The server of claim 1, wherein the processor further receives an indication of whether the target device performs the update as a copy-and-replace or using separate memory banks and comprises an indication of a size of buffer memory in the target device; and wherein the processor is configured to determine the number of sections of the delta in which to transmit responsive to identifying that the target device performs the update as a copy-and-replace and based on the size of the buffer memory.

5. A server configured to transmit a software update to a vehicle or a premises, the server comprising:

a communication interface configured to communicate with the vehicle; and a processor in communication with the communication interface, the processor configured to:

receive an indication of one or more capabilities of target device resident in the vehicle and subject to the software update;

determine, based on the one or more capabilities of the target device, one or more of a delta algorithm, a compression algorithm or a number of sections of the software update in which to transmit;

generate, based on the one or more of a delta algorithm, a compression algorithm or a number of sections of the software update in which to transmit, a delta between a current version of software resident in the target device and the software update, wherein the delta is divided into a plurality of integral sections; and send, based on the determined one or more of the delta algorithm, compression algorithm or number of sections, the delta to the vehicle in order to update the software of the target device by:

accessing a first integral section of the software update, the first integral section comprising one of the plurality of integral sections;

determining, by reviewing an entirety of a current version of the software in the target device, a section of the current version by which to generate a first delta, the first delta comprising a difference between the first integral section of the software update and the section of the current version by which to generate a first delta;

transmitting, to the target device, the first delta in order for the first integral section of the software update to be installed in the target device;

accessing another integral section of the software update, the another integral section comprising one of the plurality of integral sections;

determining, by reviewing less than the entirety of the current version of the software in the target device, another section of the current version by which to generate another delta, the another delta comprising a difference between the another integral section of the software update and the another section of the current version by which to generate a first delta; and transmitting, to the target device, the another delta in order for the another integral section of the software update to be installed in the target device.

6. The server of claim 5, wherein a size of buffer memory in the target device is sufficient to store X integral sections of the plurality of integral sections; and wherein the processor is configured to review less than the entirety of the current version of the software in the target device responsive to determining to the another section of the current version is for an X+1 integral section of the plurality of integral sections.

7. The server of claim 6, wherein the processor is configured to transmit the another delta including a plurality of reference attributes; and wherein the reference attributes include:

copypos is an offset in a reference image resident in a memory of the target device indicative to the target device from where to copy from;

copylen is a number of bytes to copy from the reference image;

copydiffbytes is a number of copydiffbytes; and extralen is a number of bytes of extrabytes.

8. The server of claim 1, wherein the processor further receives an indication of a size of volatile memory available to the target device.

9. The server of claim 8, wherein the processor is configured to determine, based on the size of volatile memory available to the target device, to divide the delta into the number of sections.

10. The server of claim 9, wherein the number of sections comprises N sections; and wherein the processor is further configured to determine, based on the size of volatile memory available to the target device, a content of the N sections of the delta.

11. The server of claim 10, wherein the processor is further configured to poll a download manager client device resident in the vehicle in order for the download manager client device to transmit the indication of one or more capabilities of a target device.

12. A server configured to transmit a software update to a vehicle or a premises, the server comprising:

a communication interface configured to communicate with the vehicle; and a processor in communication with the communication interface, the processor configured to:

receive an indication of one or more capabilities of target device resident in the vehicle and subject to the software update, wherein the one or more capabilities of the target device comprise decryption capabilities;

determine, based on the one or more capabilities of the target device, one or more of a delta algorithm, a compression algorithm or a number of sections of the software update in which to transmit;

generate, based on the one or more of a delta algorithm, a compression algorithm or a number of sections of the software update in which to transmit, a delta between a current version of software resident in the target device and the software update; and responsive to determining that the target device does not include decryption capabilities, cause the delta to be transmitted to an electronic device at a node within the vehicle nearest to the target device in order for the electronic device to decrypt the delta and then transmit to the target device for the software update.

13. An update agent electronic device resident in electronic system, the electronic system controlling one of a vehicle or a premises and including electronic devices, the electronic devices communicating with devices external to the vehicle or the premises via one or more communication channels, the update agent electronic device comprising:
  a communication interface configured to communicate, via the one or more communication channels, with an external server; and
  a processor in communication with the communication interface, the processor configured to:
    responsive to the external server receiving an indication that a target electronic device does not include decryption capabilities, receive, from the external server, a software update for installation within the target electronic device, the target electronic device resident in the vehicle or the premises, in communication with the update agent electronic device, and configured to execute software;
    transmit the software update to an electronic device at a node within the vehicle nearest to the target device in order for the electronic device to decrypt the software update;
    cause at least some of the communication channels to cease at least one aspect of operations at least partly while the decrypted software update is transmitted from the electronic device to the target electronic device;
    receive, from the target electronic device, confirmation of receipt by the target electronic device of the decrypted software update from the electronic device; and
    responsive to receiving the confirmation of receipt by the target electronic device of the decrypted software update, cause the at least some of the communication channels to resume the at least one aspect of operations.

14. The update agent electronic device of claim 13, wherein the one or more communication channels include one or more devices resident in the vehicle or the premises configured to receive incoming communications and to route the incoming communications to electronic devices resident in the vehicle or the premises;
  wherein the processor is configured to cease at least one aspect of the operations by commanding the one or more devices to buffer the incoming communications without routing the incoming communications to the electronic devices until a separate resume command is received, the resume command indicative to the one or more devices to resume routing; and
  wherein the processor is configured to cause the at least some of the communication channels to resume the at least one aspect of the operations by sending the resume command to the one or more devices.

15. The update agent electronic device of claim 14, wherein the one or more communication channels comprise one or more ports.

16. The server of claim 1, wherein the processor is further configured to receive an indication of one or more capabilities of a bus resident in the vehicle through which the target device communicates; and
  wherein the processor is configured to determine the delta algorithm based on the one or more capabilities of the bus resident in the vehicle through which the target device communicates.

17. The server of claim 1, wherein the processor is further configured to receive an indication of one or more capabilities of a bus resident in the vehicle through which the target device communicates; and
  wherein the processor is configured to determine the compression algorithm based on the one or more capabilities of the bus resident in the vehicle through which the target device communicates.

18. The server of claim 1, wherein the processor is further configured to receive an indication of one or more capabilities of a bus resident in the vehicle through which the target device communicates; and
  wherein the processor is configured to determine the number of sections of the software update in which to transmit based on the one or more capabilities of the bus resident in the vehicle through which the target device communicates.

* * * * *